United States Patent
Yeh et al.

(10) Patent No.: US 9,229,546 B2
(45) Date of Patent: Jan. 5, 2016

(54) CIRCUIT OF FREQUENCY COUNTER AND METHOD THEREOF

(71) Applicant: WALTOP INTERNATIONAL CORPORATION, Hsinchu County (TW)

(72) Inventors: Chia-Jui Yeh, Hsinchu County (TW); Cheng-Wei Wang, Hsinchu (TW); In-koune Kao, Hsinchu (TW)

(73) Assignee: WALTOP INTERNATIONAL CORPORATION, Hsinchu County (TW)

( * ) Notice: Subject to any disclaimer, the term of this patent is extended or adjusted under 35 U.S.C. 154(b) by 66 days.

(21) Appl. No.: 14/305,057

(22) Filed: Jun. 16, 2014

(65) Prior Publication Data
US 2015/0301628 A1    Oct. 22, 2015

(30) Foreign Application Priority Data
Apr. 18, 2014   (TW) ............... 103114202 A

(51) Int. Cl.
*G06F 3/033*   (2013.01)
*G06F 3/038*   (2013.01)
*G06F 3/0354*  (2013.01)

(52) U.S. Cl.
CPC .......... *G06F 3/0383* (2013.01); *G06F 3/03545* (2013.01)

(58) Field of Classification Search
CPC ............ G06F 3/03545; G06F 3/04883; G06F 3/0317; G06F 1/1626
See application file for complete search history.

(56) References Cited

U.S. PATENT DOCUMENTS

| | | | |
|---|---|---|---|
| 4,848,496 A | 7/1989 | Murakami et al. | |
| 5,600,105 A | 2/1997 | Fukuzaki et al. | |
| 5,986,646 A * | 11/1999 | Chen ................ | G06F 3/046 345/173 |
| 2009/0046827 A1 * | 2/2009 | Tasher ............... | G01D 5/2405 377/19 |

FOREIGN PATENT DOCUMENTS

EP    0513559 A2    6/1998

* cited by examiner

*Primary Examiner* — Md Saiful A Siddiqui
(74) *Attorney, Agent, or Firm* — Li & Cai Intellectual Property (USA) Office

(57) ABSTRACT

A circuit of frequency counter is adapted for an electromagnetic board with an electromagnetic pen. The counter exemplarily includes a source count module, a motion count module, a logic module, a switching gate module, a signal-capturing module, a frequency-counting module and a control module. The source count module counts number of clock pulses of a first clock signal. A receiver mode is switched by the switching gate module when the number reaches a first predetermined value. The motion count module counts number of clock pulses of a second clock signal. A transmitter mode is made by the switching gate module when the number reaches a second predetermined value. When a cumulative number of circular number counted by the frequency-counting module reaches a third predetermined value, the frequency-counting module completes counting a first high-frequency clock signals, and the control module obtains an operating frequency for the electromagnetic pen.

17 Claims, 14 Drawing Sheets

CIRCUIT OF FREQUENCY COUNTER AND METHOD THEREOF

BACKGROUND OF THE INVENTION

1. Field of the Invention

The present invention is generally related to a frequency counter and a method thereof, in particular to the frequency counter and method adapted to a handwriting apparatus.

2. Description of Related Art

A handwriting apparatus is generally an assembly of an electromagnetic board and an electromagnetic pen. The conventional handwriting tool may be categorized based on the related stylus, e.g. electromagnetic pen, which may have built-in battery and the other type of electromagnetic pen without inside battery set. The battery-free electromagnetic pen adapts a passive charging technology being disclosed in various prior references such as U.S. Pat. No. 4,848,496, U.S. Pat. No. 5,600,105, and EP0513559 A2.

In general, the battery-free electromagnetic pen takes power from the electromagnetic board since it has no inside battery set. The antenna coil inside the electromagnetic board is employed to deliver the electromagnetic signals/energy to the electromagnetic pen and receive electromagnetic signal there-from. Therefore the behavior of the electromagnetic pen can be detected through the signal pulses with specific range of frequency made by the antenna coil; wherein the signal pulses are such as electromagnetic energy. The electromagnetic pen may store little energy after resonance while it is disposed with a resonance circuit having coils connected with a capacitor.

The electromagnetic board stops emitting signals and becomes a receiver mode after the detection is performed. In the meantime, the battery-free electromagnetic pen delivers the electromagnetic signals made by this pen's oscillation frequency. The oscillation frequency enables the electromagnetic pen consume the stored energy immediately. For this reason, the battery-free electromagnetic pen may not constantly emit electromagnetic signals to the electromagnetic board for a long time. When the energy of electromagnetic pen is exhausted, the electromagnetic board becomes a transmitter mode for emitting the electromagnet energy. After that, the board again changes to be the receiver mode for receiving the signals made by the electromagnetic pen. The operations mentioned above are cyclkally repeated.

Inside the electromagnetic pen, a frequency changer driven by stressing the pen tip is installed. The electromagnetic board includes a frequency counter, analog-to-digital converter, and a control module or a micro-processor. The frequency counter is connected to a phase discriminator or an integrator. The output of integrator is connected to the input of the analog-to-digital converter. That means the change of oscillation frequency of the electromagnetic pen drives the output of integrator to be changed when the user stresses the tip of electromagnetic pen. The output of integrator undergoing the analog-to-digital converter is converted to digital values that sent to the control module. The control module calculates the output coordinates and the digital value indicative of stress of pen tip. The coordinates and the gradation of the pressure are then transmitted to a display device.

When the prior technologies employ the phase discriminator, integrator, or any other method of integration to obtain the pressure-integration signals. The pressure-integration signals are kind of analog signals which may result in ambient interference to the frequency counter. The interference may cause larger voltage error of the output of integrator that seriously affects the gradation of pressure generated by the pen tip.

SUMMARY OF THE INVENTION

The application of the present invention discloses a new type of frequency counter and a method. A frequency-counting module is enabled to output a high-frequency clock signal. The frequency-counting module completes counting the high-frequency clock signals when its circular number reaches a third predetermined value. In the meantime, the control module precisely acquires a pressure sensing gradation of an electromagnetic pen according to the high-frequency clock signal which is completely counted.

Disclosure in the present invention is a frequency counter adapted to an electromagnetic board and an electromagnetic pen. The frequency counter is disposed in an electromagnetic board. The frequency counter includes a source count module, a motion count module, a logic module, a switching gate module, a signal-capturing module, a frequency-counting module, and a control module. The source count module is used to receive a first clock signal, and is with a first predetermined value. The motion count module is used to receive a second clock signal, and is with a second predetermined value. The electromagnetic pen outputs a second electromagnetic signal as in a discharge mode. The second electromagnetic signal is received by the electromagnetic board and processed to generate the second clock signal.

When an accumulated number of clock pulses of the first clock signal computed by the source count module reaches a first predetermined value, the logic module generates a switching signal to a switching gate module. The switching gate module drives the switching gate module switched to a receiver mode. When the accumulated number of clock pulses of the second clock signal reaches the second predetermined value, the logic module generates a switching signal to the switching gate module. The switching gate module is therefore switched to a transmitter mode. In response to a second clock signal, the signal-capturing module generates a gate enable signal to the frequency-counting module, so as to enable the frequency-counting module to count the first high-frequency clock signal. When the accumulated number of circular number reaches a third predetermined value, the frequency-counting module outputs the number of the first high-frequency clock signal to the control module. The control module therefore computes frequency of the second electromagnetic signal. In which the first high-frequency clock signal is a frequency-doubling signal of the second clock signal.

Disclosure in the present invention is related to a method of frequency counting. The method is adapted to a frequency counter for an electromagnetic pen and an electromagnetic board. In the method, the source count module receives a first clock signal. The next step is to judge if the accumulated number of clock pulses of the first clock signal reaches a first predetermined value of the source count module. If it is judged that the accumulated number reaches the first predetermined value, the logic module generates a switching signal to the switching gate module. The switching gate module is therefore switched to a receiver mode. The motion count module receivers a second clock signal. Next, it is to judge if the accumulated number of clock pulses of the second clock signal reaches a second predetermined value of the motion count module. When the accumulated number reaches the second predetermined value, the logic module generates a switching signal to switch the switching gate module, so as to drive the switching gate module to be switched to a transmitter mode. In response to the second clock signal, the signal-capturing module generates a gate enable signal to the frequency-counting module. The frequency-counting module is driven to count a high-frequency clock signal. Further, it is determined that if the accumulated number of circular number of the frequency-counting module reaches a third predetermined value. If the determination is positive, the frequency-counting module completes counting the second high-frequency clock signal. The control module computes a pressure sensing gradation according to the second high-frequency clock signal as the counting is done.

In accordance with the present invention, the frequency counter is employed. The signal-capturing module acquires the second clock signal from the motion count module. The signal-capturing module outputs gate enable signal to the frequency-counting module based on the fixed number of clock pulses of the second clock signal. The frequency-counting module may be enabled to output the second high-frequency clock signal. Still further, when the circular number of the frequency-counting module reaches the third predetermined value, then frequency-counting module completes counting the second high-frequency clock signal. The control module precisely acquires the pressure sensing gradation of the pen based on the second high-frequency clock signal.

BRIEF DESCRIPTION OF THE DRAWINGS

FIG. 7-1 is a flow chart illustrating the method in one embodiment of the present invention;

FIG. 7-2 is a flow chart illustrating the method for frequency counting in one further embodiment of the present invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
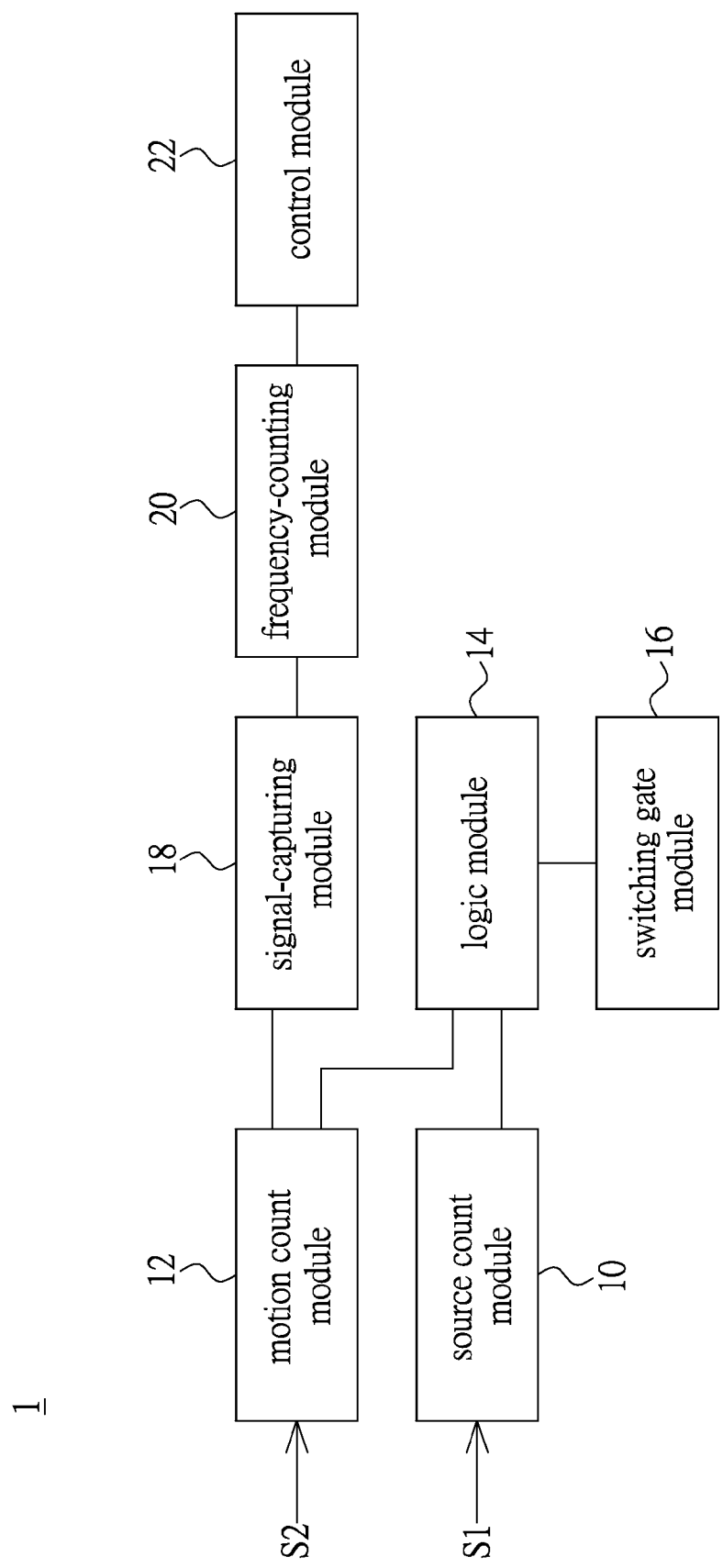
FIG. 1 shows a function block depicting a frequency counter according to one of the embodiments of the present invention.

FIG. 1 firstly shows a function diagram depicting a frequency counter in one embodiment of the present invention. Reference is made to FIG. 1 showing a frequency counter 1 which is adapted to assembly of an electromagnetic board and an electromagnetic pen. The frequency counter 1 is disposed in an electromagnetic board. The frequency counter 1 includes a source count module 10, a motion count module 12, a logic module 14, a switching gate module 16, a signal-capturing module 18, a frequency-counting module 20, and a control module 22.

In practice, the source count module 10 is coupled to the logic module 14. The motion count module 12 is coupled to the logic module 14 and the signal-capturing module 18. The switching gate module 16 is coupled to the logic module 14. The frequency-counting module 20 is coupled to the signal-capturing module 18 and the control module 22. The frequency counter 1 may not be only limited to the embodiment shown in FIG. 1.

Furthermore, the signal-capturing module 18 acquires a second clock signal S2 from the motion count module 12. The signal-capturing module 18 outputs gate enable signal to the frequency-counting module 20 according to the second clock signal S2. The frequency-counting module 20, in response to the gate enable signal, is enabled to output a second high-frequency clock signal, or stop outputting the second high-frequency clock signal. The second high-frequency clock signal is such as a state of intersection of the first high-frequency clock signal and the gate enable signal. The first high-frequency clock signal is double frequency of the second clock signal S2. When the circuit number of the frequency-counting module 20 reaches a third predetermined value, the frequency-counting module 20 outputs the result of counting the high-frequency clock signal to the control module 22, so as to drive the control module 22 to precisely compute a pressure sensing gradation of the tip of the electromagnetic pen.

Besides, the electromagnetic board emits first electromagnetic signal to the electromagnetic pen through the switching gate module 16 for charging the electromagnetic pen. The energy may be stored in the electromagnetic pen. While the electromagnetic board stops emitting the electromagnetic signal, the electromagnetic pen is converted to be discharging mode. The signals are emitted by the electromagnetic pen using its own oscillation frequency as the electromagnetic pen discharges. The electromagnetic board then receives the weak signals such as the second electromagnetic signal. The second electromagnetic signal may attenuate with time flies. Therefore, the electromagnetic board is required to remit the first electromagnetic signal to the electromagnetic pen to be charged before the second electromagnetic signal is attenuated to zero or the electromagnetic board fails to obtain the second electromagnetic signal.

The electromagnetic board, in accordance with the present invention, computes the timing for the electromagnetic board emitting the first electromagnetic signal to the pen through the source count module 10. The electromagnetic board also computes the timing for the electromagnetic pen emitting second electromagnetic signal to the board through the motion count module 12. The electromagnetic board drives the switching gate module 16 to switch to a transmitter mode or receiver mode for emitting or receiving the electromagnetic signal through the logic module 14. The operations allow the electromagnetic pen to travel over the electromagnetic board for handwriting or plotting.

The source count module 10 is used to receive a first clock signal S1. The source count module 10 exemplarily includes at least one counting unit, a latch unit, and a comparing unit. The first clock signal S1 is as a clock signal for the electromagnetic board. The clock signal may be indicative of a plurality of clock pulses that are counted by the counting unit. The counting unit is, although not exclusive, such as synchronous counter or an asynchronous counter.

The source count module 10 is with a first predetermined value. The first predetermined value is such as one, two, three or other integers. The first predetermined value is defined based on the charging or discharging characteristics of electromagnetic board and electromagnetic pen. However, the ordinary person in the art may be free to define the first predetermined value. The latch unit is configured to be a constant value, for example the position of twelfth clock pulse of the first clock signal S1. The latch unit outputs a constant value to the comparing unit. However, the present embodiment may not limit the practical use of the source count module 10 and the first clock signal S1.

The motion count module 12 is used to receive a second clock signal S2. The motion count module 12 is with a second predetermined value. In an exemplary example, the motion count module 12 is disposed inside the frequency counter 1 of the electromagnetic board. The motion count module 12 may correspondingly be the electromagnetic pen emitting the second electromagnetic signal for computing number of the sinusoid waves made by the electromagnetic pen. In an exemplary example, the motion count module 12 includes at least one counting unit, a latch unit, and a comparing unit. The operations of the counting units of motion count module 12, the counting unit, and the latch unit, and the comparing unit may be referred to the above mentioned embodies.

The second clock signal S2 is generated by the electromagnetic pen as it is in discharge mode. The electromagnetic board therefore receives the second electromagnetic signal. The clock signal is generated after amplification and processing. The embodiment may be not limited to the type of clock signal S2. In an exemplary example, the first predetermined value may be twelve, and the second predetermined value is seven. The second predetermined value is note equal to the first predetermined value. The second predetermined value may be, but not exclusive of, larger or smaller than the first predetermined value.

It is worth noting that the electromagnetic board is enabled to switch the switching gate module to be in a transmitter mode, in the meantime the electromagnetic board emits the first electromagnetic signal to the electromagnetic pen which is to be charged. The source count module 10 counts the accumulated number of clock pulses of first clock signal S1. When the accumulated number reaches the first predetermined value, the logic module 14 changes the state of switching gate module 16. The switching gate module 16 is then switched to be a receiver mode, so as to stop emitting the first electromagnetic signal to the electromagnetic pen. The switching gate module 16 is able to receive the second electromagnetic signal via sensing coil. The second electromagnetic signal may be amplified, filtered, and/or converted to the second clock signal S2; the motion count module 12 is then activated to compute the number of clock pulses of the second clock signal S2.

When the accumulated number of the clock pulses of the second clock signal S2, computed by the motion count module 12 reaches the second predetermined value, the logic module 14 changes the state of the switching gate module 16. For example, when the switching gate module 16 is switched to a transmitter mode, the source count module 10 starts counting the number of clock pulses of the first clock signal S1. Under this mode, the electromagnetic board emits first electromagnetic signal to the electromagnetic pen that is to be electrically charged.

The logic module 14 is coupled to the source count module 10 and the motion count module 12. The logic module 14 may include, although not exclusive of, an inverter, AND logic gate, OR logic gate, and a latch. The logic module 14, in response to the clock signal made by the source count module 10 and the motion count module 12, generates a switching signal. The switching signal is such as a signal of first logic voltage which demands the electromagnetic board to emit the electromagnetic signal for the electromagnetic pen. The switching signal is such as a signal of second logic voltage which demands the electromagnetic board to receive the second electromagnetic signal from the electromagnetic pen. In brief, the mentioned first and second logic voltages are respectively a low logic voltage and a high logic voltage. The embodiments may not be used to limit the types of the mentioned switching signal, first and second logic voltages according to the present invention.

The switching gate module 16 is coupled to the logic module 14, a power source, and a receiver antenna. In practice, the switching gate module 16 may be, but not limited to, a Single-Port-Double-Throw (SPDT) switch, an analog switch or a digital switch. The switching gate module 16, in response to the switching signal, is switched to be a transmitter mode or a receiver mode. In response to the switching signal under first logic voltage, the switching gate module 16 is used to emit the first electromagnetic signal to the electromagnetic pen. The switching gate module 16 then stops emitting the electromagnetic signal to the electromagnetic pen. At this moment, the electromagnetic pen will convert the first electromagnetic signal into the second electromagnetic signal that is transmitted to the electromagnetic board. In response to the switching signal under second logic voltage, the switching gate module 16 is to receive the second electromagnetic signal from the electromagnetic pen.

The source count module 10 is configured to have a first predetermined value. The source count module 10 receives the first clock signal S1. When the accumulated number of clock pulses of the first clock signal S1 reaches the first predetermined value, the logic module 14 generates a switching signal to the switching gate module 16 that drives the switching gate module 16 stopping emitting the first electromagnetic signal to the electromagnetic pen. The motion count module 12 is configured to have a second predetermined value. The motion count module 12 receives the second clock signal S2. The motion count module 12 computes the accumulated number of clock pulses of the second clock signal S2. When the accumulated number reaches the second predetermined value, the logic module 14 generates a switching signal to the switching gate module 16. The switching gate module 16 is activated to emit the first electromagnetic signal to the electromagnetic pen.

Reference is made to FIG. 1 showing the operation of the electromagnetic board raising the pressure sensing gradation of the pen tip of the electromagnetic pen.

Assembly of a signal-capturing module 18 and a frequency-counting module 20 provides a solution for raise the pressure sensing gradation of the pen tip computed by the electromagnetic board of a handwriting apparatus. The signal-capturing module 18 is coupled to midst of the motion count module 12 and the frequency-counting module 20. The signal-capturing module 18 generates a gate enable signal to the frequency-counting module 20 according to the second clock signal S2. The frequency-counting module 20 receives a first high-frequency clock signal. The frequency-counting module 20 is enabled to output a second high-frequency clock signal according to gate enable signal. The frequency-counting module 20 is configured to have a circular number. When this circular number reaches the third predetermined value, the frequency-counting module 20 completes counting the first high-frequency clock signal. The result of counting is transmitted to the control module 22. The control module 22 may precisely compute the frequency of the second electromagnetic signal of the electromagnetic pen, and obtain pressure sensing gradation of the electromagnetic pen's tip.

Furthermore, the signal-capturing module 18 includes an inverter, a latch, and a AND logic gate. The present embodiment may not be limited to any type of the signal-capturing module 18. The signal-capturing module 18 is used to capture a certain number of clock pulses of the second clock signal S2. The output level of the signal-capturing module 18 may be changed according to the second clock signal S2 of the motion count module 12. For example, the output level is high when the accumulated number of clock pulses of the second clock signal S2 does not yet reach the second predetermined value. Otherwise, the output level is low logic voltage when the accumulated number of clock pulses of the second clock signal S2 reaches the second predetermined value.

In some further embodiments, the output level of the signal-capturing module 18 may be changed in response to the constant number of clock pulses of the second clock signal S2. For example, the output level of the signal-capturing module 18 corresponds to the clock pulses in the middle portion of the second clock signal S2, and output the high logic voltage. On the contrary, the output level of the signal-capturing module 18 may correspond to the first few and last few clock pulses of the second clock signal S2, and output the low logic voltage. The high logic voltage enables the frequency-counting module 20. However, the present embodiment may not be limited to any operational type of the second clock signal S2 of the signal-capturing module 18 and the motion count module 12.

The frequency-counting module 20 includes a logic gate, a counter, a comparator, and a latch. The frequency-counting module 20 is with a circular number. The circular number increases once when the accumulated number of clock pulses of the second clock signal S2 is equal to the predetermined value. When the circular number reaches the third predetermined value, the frequency-counting module 20 completes high-frequency counting. In practice, the third predetermined value is employed to limit the circular number of transceiving rounds of the electromagnetic board and the electromagnetic pen. In an exemplary example, the third predetermined value may be, but not limited to, configured to be twenty.

Further, the first high-frequency clock signal is doubling the second clock signal S2. For example, the first high-frequency clock signal is doubling, tripling, quadrupling, or N-times the second clock signal S2. The invention may not be limited to the first high-frequency clock signal being multiple times of the second clock signal S2.

When the accumulated number of circular number of the frequency-counting module 20 reaches the third predetermined value, the number may be reset to zero. In response to the number of the first high-frequency clock signal, the control module 22 computes a pressure sensing gradation of the electromagnetic pen's tip. The result of counting the first high-frequency clock signal is equivalent to the result of counting intersection of the first high-frequency clock signal and the gate enable signal. In other words, the result of counting the first high-frequency clock signal is equivalent to the result of counting the second high-frequency clock signal. The second high-frequency clock signal is a state of intersection of the first high-frequency clock signal and the gate enable signal. More precisely, the control module 22 computes the frequency of the second electromagnetic signal of the electromagnetic pen as completely counting the second high-frequency clock signal. The pressure sensing gradation of the pen tip is therefore obtained.

For example, the circular number of transceiving rounds of the electromagnetic board and electromagnetic pen may be set to twenty. The electromagnetic board precisely counts the number of the second high-frequency clock signal, and accordingly obtains the pressure sensing gradation of the electromagnetic pen's tip. The frequency-counting module 20 computes the twenty transceiving rounds of second high-frequency clock signal so as to obtain the pressure sensing gradation.

The frequency range for operating the electromagnetic pen is exemplarily around 200 kHz to 220 kHz. In an exemplary example, if a measurement cycle is set as ten clock pulses, the time for measuring 200 kHz signals is 0.05 ms, the for 220 kHz signals is 0.04545 ms. The amount of change is such as 4.5 μs. The 4.5 μs change may be represented by 1024× or higher resolution signals. The timer for counting operation requires a high clock pulse for representing the high-frequency clock signal. If, for some reasons, the frequency of clock pulse fails to be pulled high, the similar effect may be obtained when increasing the circular number. Therefore, in some embodiments, the circular number of the frequency-counting module 20 may be increased to twenty transceiving rounds. The amount of change 4.5 μs may be represented by 1024× or higher resolution signals. The electromagnetic board may compute the pressure sensing gradation for the electromagnetic pen with higher accuracy.

The mentioned frequency range around 200 kHz to 220 kHz may be used to derive the force or brush stroke for the electromagnetic pen pressuring the electromagnetic board. When the time variation in 4.5 μs may be represented by 1024× or higher resolution signals, the third predetermined value may be raised for increasing the number of counting the second high-frequency clock signal by frequency-counting module 20. The frequency-counting module 20 may precisely acquire frequency for operating the electromagnetic pen. The frequency for the electromagnetic pen indicates the force or stroke onto the electromagnetic board. The electromagnetic board may therefore compute the pressure sensing gradation for the electromagnetic pen in higher resolution. It is noted that the present embodiment may not be used to limit the operational type of the frequency-counting module 20 and the circular number.

Figure 2A:
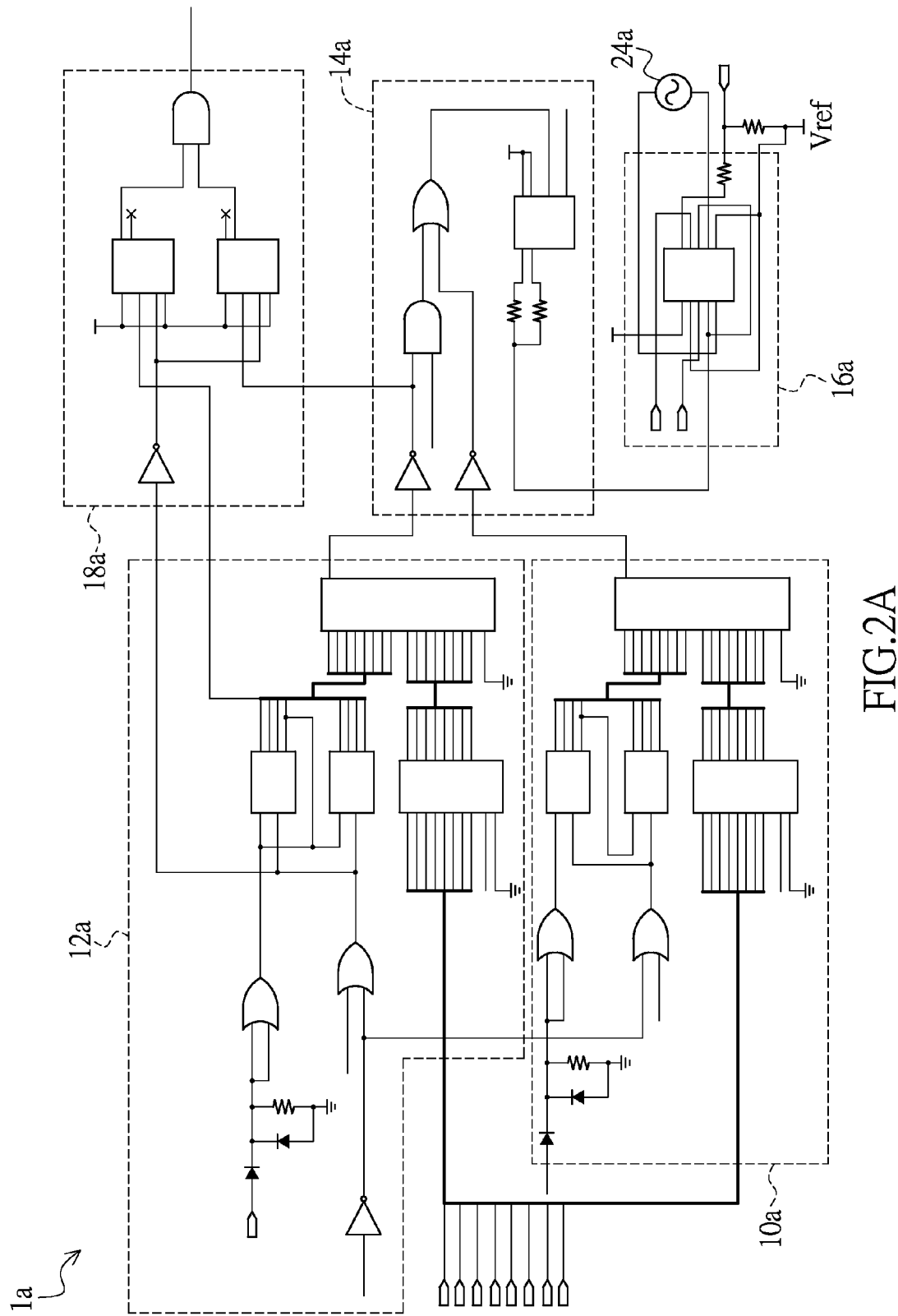
FIG. 2A shows a portion of circuit diagram illustrating the frequency counter in one further embodiment of the present invention.
Figure 2B:
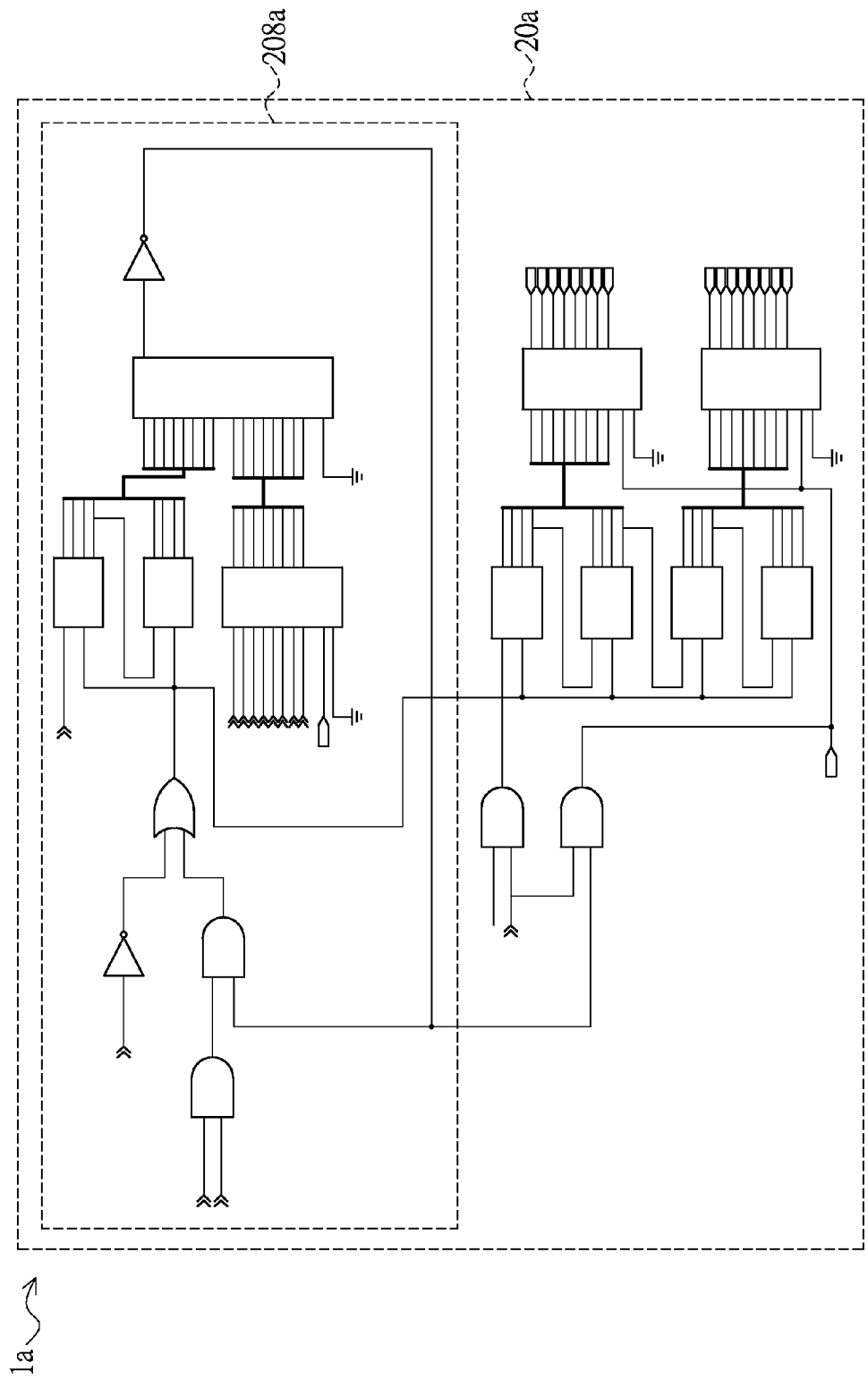
FIG. 2B is one portion of circuit coupled to the circuit of frequency counter illustrated in FIG. 2A.
Figure 3A:
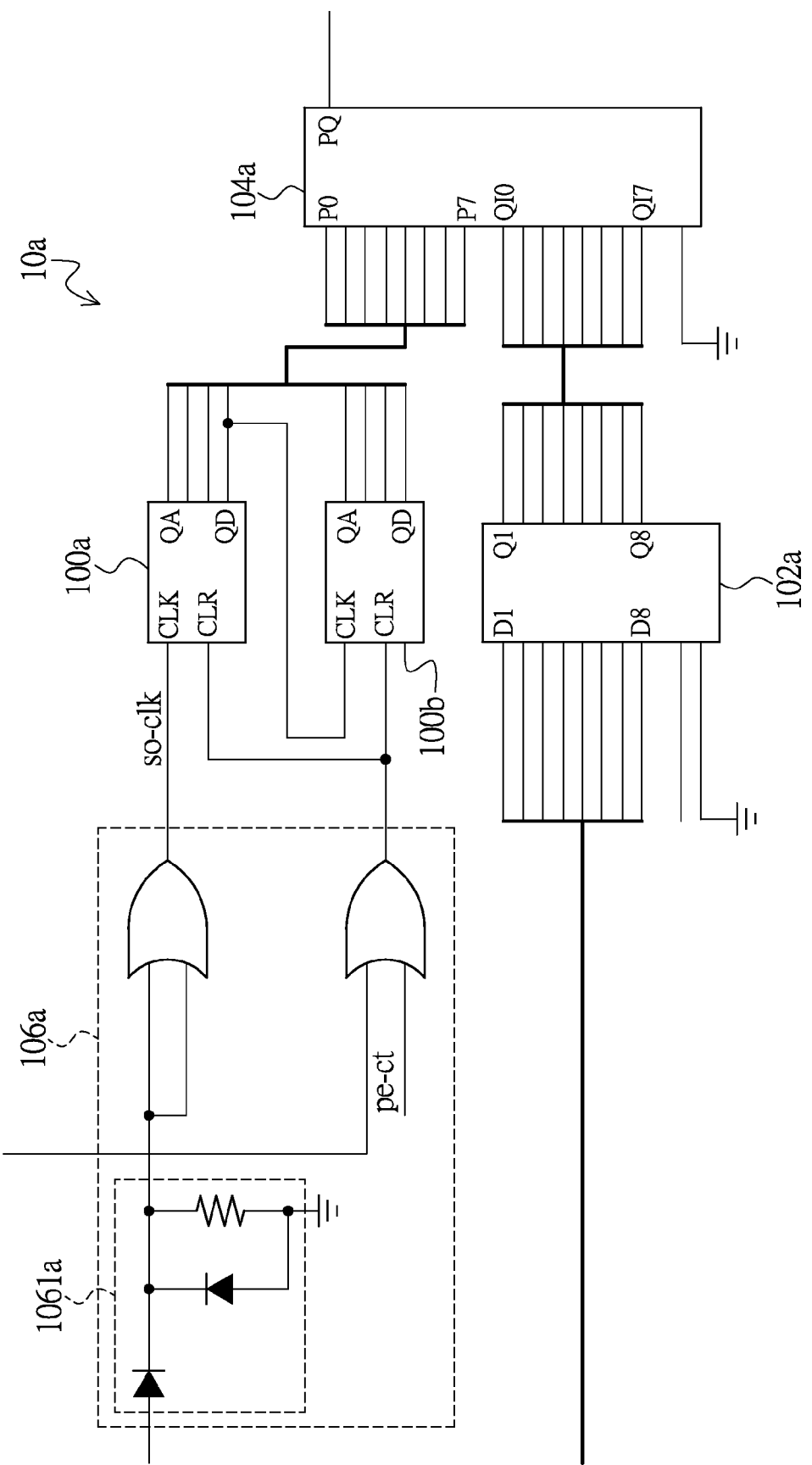
FIG. 3A schematically shows a detail circuit of the source count module illustrated in FIG. 2A according to one embodiment of the present invention.

FIG. 2A shows a portion of circuit of frequency counter in one further embodiment in accordance with the present invention. FIG. 2B shows another part of circuit of the frequency counter coupled to the circuit shown in FIG. 2A. FIGS. 3A through 3E show the details of the modules described in FIG. 2A, such as a source count module, a motion count module, a logic module, a switching gate module, and a signal-capturing module. FIG. 4A and FIG. 4B are respectively the detail circuits for the frequency-counting module and the circular counting unit according to the embodiment of FIG. 2B.

References are made to FIGS. 2A through 2B, FIGS. 3A through 3E, and FIGS. 4A through 4B. In FIG. 2A, a source count module 10a is provided such as the diagram in FIG. 3A.

Figure 3B:
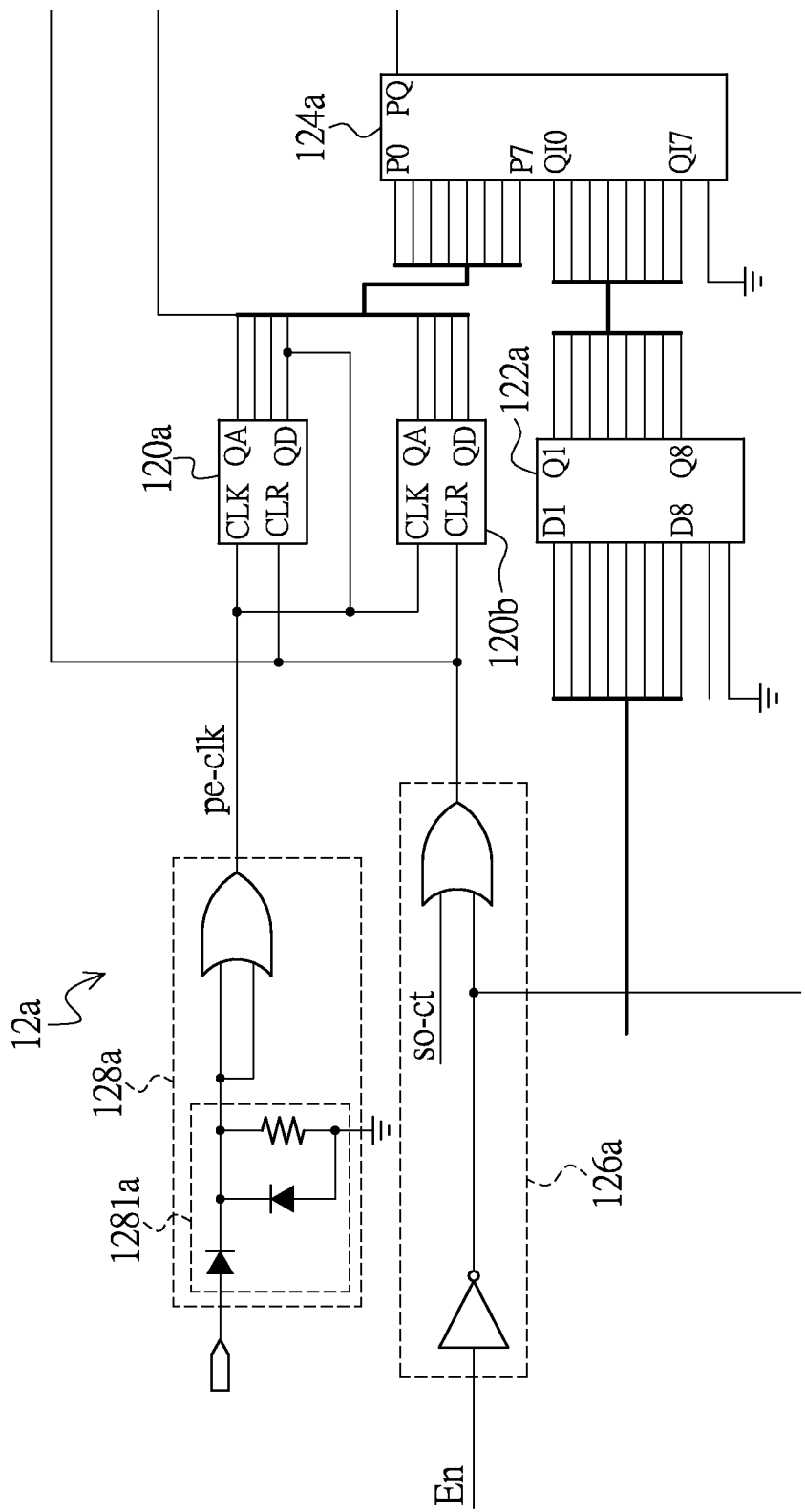
FIG. 3B schematically shows another detail circuit of the motion count module illustrated in FIG. 2A in one further embodiment of the present invention.

A motion count module 12a is provided such as the diagram shown in FIG. 3B. A logic module 14a is provided such as the diagram of FIG. 3C. A switching gate module 16a is shown, and as the diagram in FIG. 3D. A signal-capturing module 18a is shown, and as the diagram in FIG. 3E. A power source 24a is also provided. In FIG. 2B, a frequency-counting module 20a, such as the diagrams in FIG. 4A and FIG. 4B, is included. An output end of the frequency-counting module 20a is coupled to the control module (not shown in the diagram).

References are made to FIG. 2A and FIG. 3A. The source count module 10a includes a source unit 106a, two first counting units 100a, 100b, a first latch unit 102a, and a first comparing unit 104a. The every first counting unit 100a or 100b is coupled to the first comparing unit 104a. The first latch unit 102a is coupled to the first comparing unit 104a. An output end PQ of the first comparing unit 104a is coupled to the logic module 14a. An input end CLK of the first counting unit 100a is coupled to a first clock signal so-clk. The output ends QA through QD of the first counting units 100a, 100b are coupled to the first comparing unit 104a.

In detail, the source unit 106a includes a conversion component 1061a and two OR logic gates. The conversion component 1061a further includes two diodes and resistor. The conversion component 1061a is used to convert the sinusoidal signal into square wave signal. Therefore, the source unit 106a is used to output the first clock signal so-clk to the first counting unit 100a. An enable input end CLR of the first counting unit 100a is coupled to another enable input end (CLR) of another first counting unit 100b. An output end QD of the first counting unit 100a is coupled to an input end CLK of the first counting unit 100b. The first counting units 100a, 100b output 8-bit clock signal. The data input ends D1 through D8 of the first latch unit 102a are coupled to a microprocessor or control module (not shown). The source unit 106a may not be limited to any type disclosed in the specification.

As FIGS. 2A and 3B show, the motion count module 12a has a motion unit 128a, an enable unit 126a, two second counting units 120a, 120b, a second latch unit 122a, and a second comparing unit 124a. The each second counting unit 120a or 120b is coupled to the second comparing unit 124a. The second latch unit 122a is coupled to the second comparing unit 124a. An output end PQ of the second comparing unit 124a is coupled to the logic module 14a. The input end CLK of the second counting unit 120a or 120b is coupled to second clock signal pe-clk. The output ends QA through QD are coupled to the second comparing unit 124a. The data input ends D1 through D8 of the second latch unit 122a are coupled to the microprocessor or the control module (not shown in this diagram), and coupled to the data input ends D1 through D8 of first latch unit 102a of the source count module 10a.

Moreover, the motion unit 128a includes a conversion component 1281a and an OR logic gate. The conversion component 1281a has two diodes and resistor. The conversion component 1281a is used to convert the sinusoidal signal to square wave signal. The motion unit 128a outputs the second clock signal pe-clk to the second counting units 120a, 120b. The enable input ends CLK of the each second counting unit 120a or 120b are coupled with each other. The output end QD of the second counting unit 120a is coupled to the input end CLK of the second counting unit 120b. The second counting units 120a and 120b are able to output 8-bit clock signal. The mentioned motion unit 128a may not be limited to the current embodiment. The enable unit 126a includes an inverter and OR logic gate. The enable unit 126a outputs an enable signal via the inverter. In response to the enable signal, the source count module 10a and the motion count module 12a initiate a mechanism to compute the clock pulse. The embodiment may not be used to limit the types of the source count module 10a or the motion count module 12a.

Exemplarily, the first or second counting unit 100a, 100b, 120a, or 120b is such as a 74HC393 model binary ripple counter. The first or second latch unit 102a or 122a is such as 74HC373 model D latch. The first or second comparing unit 104a or 124a is such as 74HC688 model 8-bit numeric comparator.

Figure 3C:
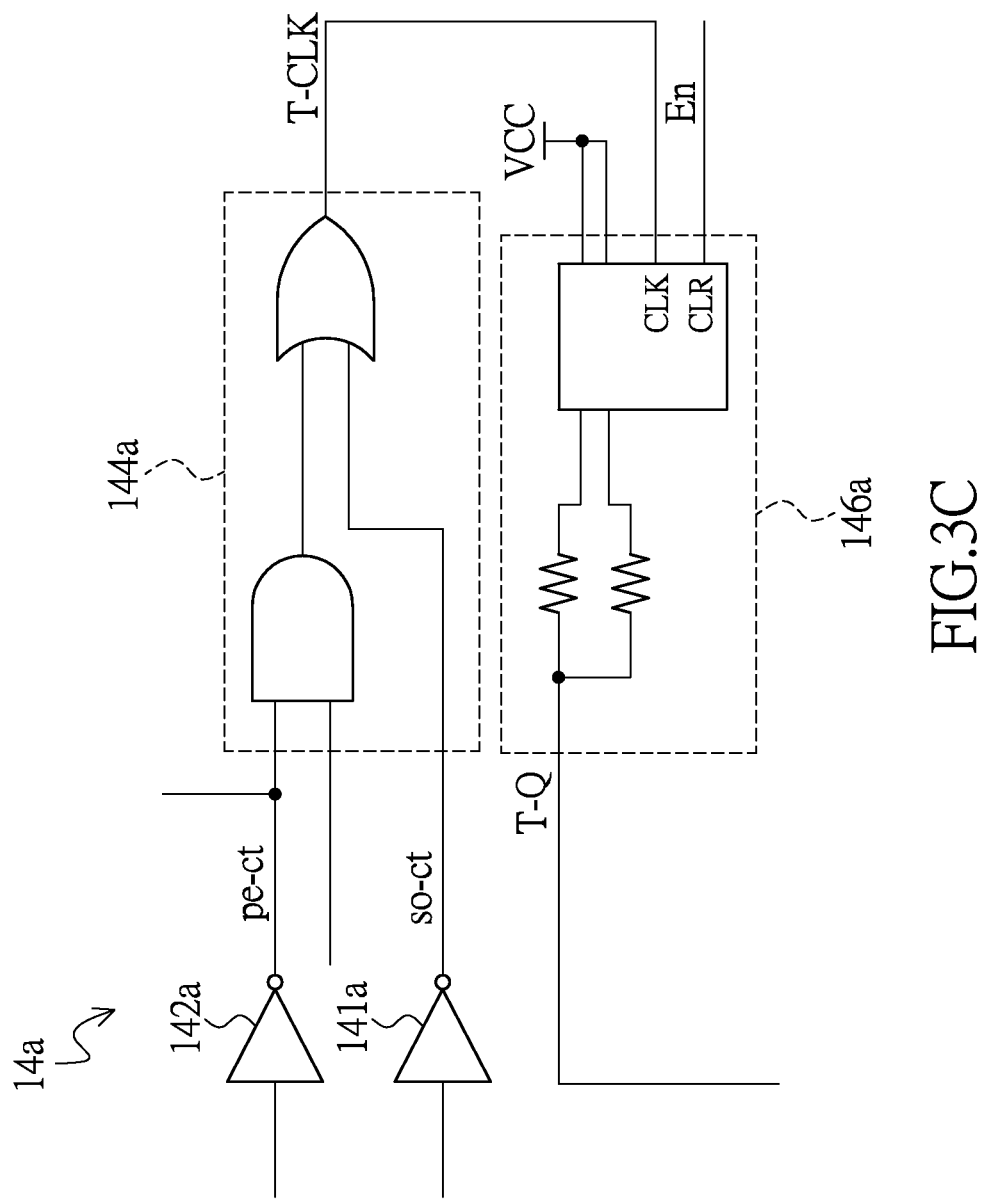
FIG. 3C schematically shows detail circuit of the logic module illustrated in FIG. 2A in one further embodiment of the present invention.
Figure 4A:
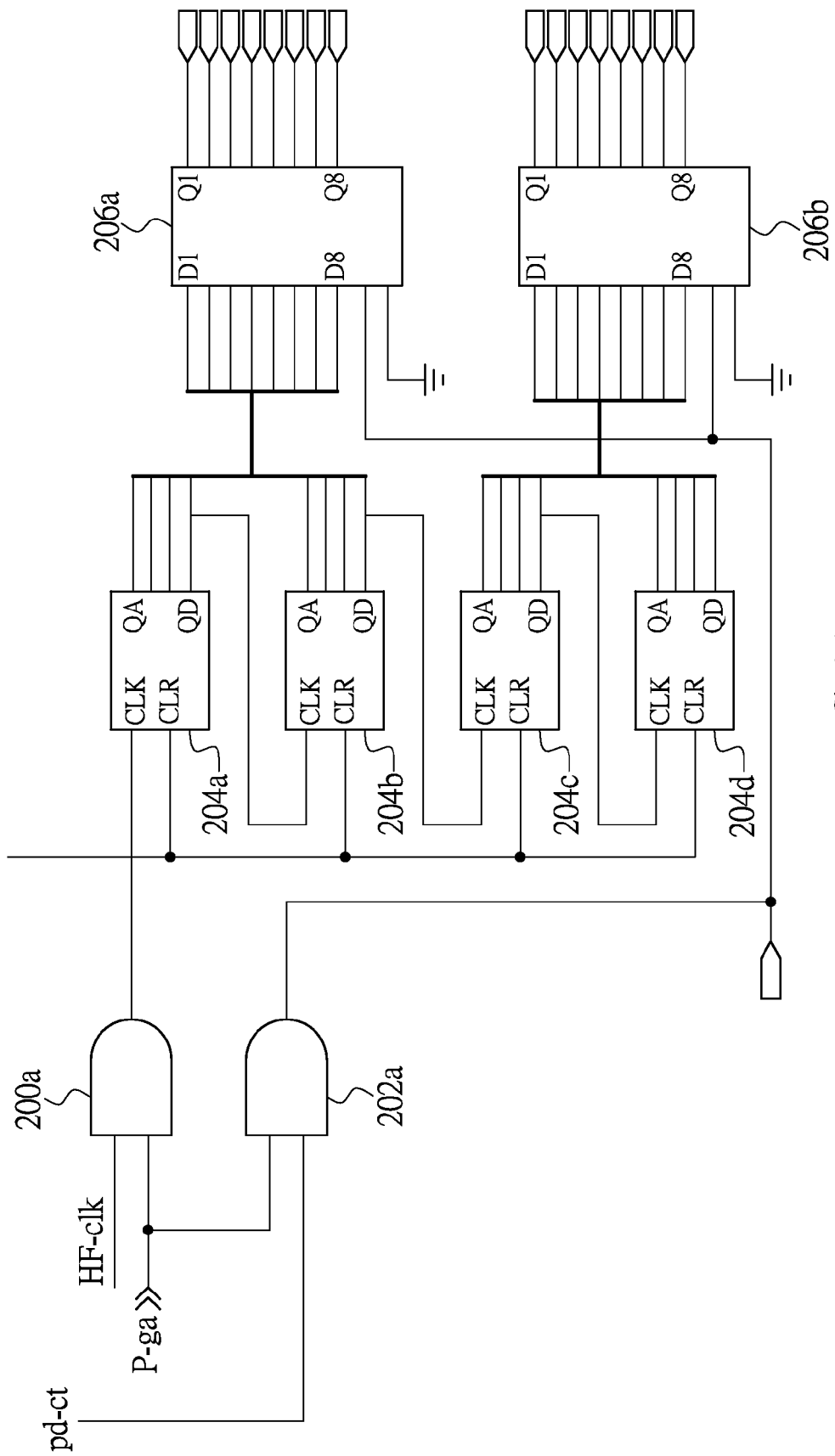
FIG. 4A schematically shows detail circuit of the frequency-counting module of FIG. 2B in one further embodiment of the present invention.
Figure 4B:
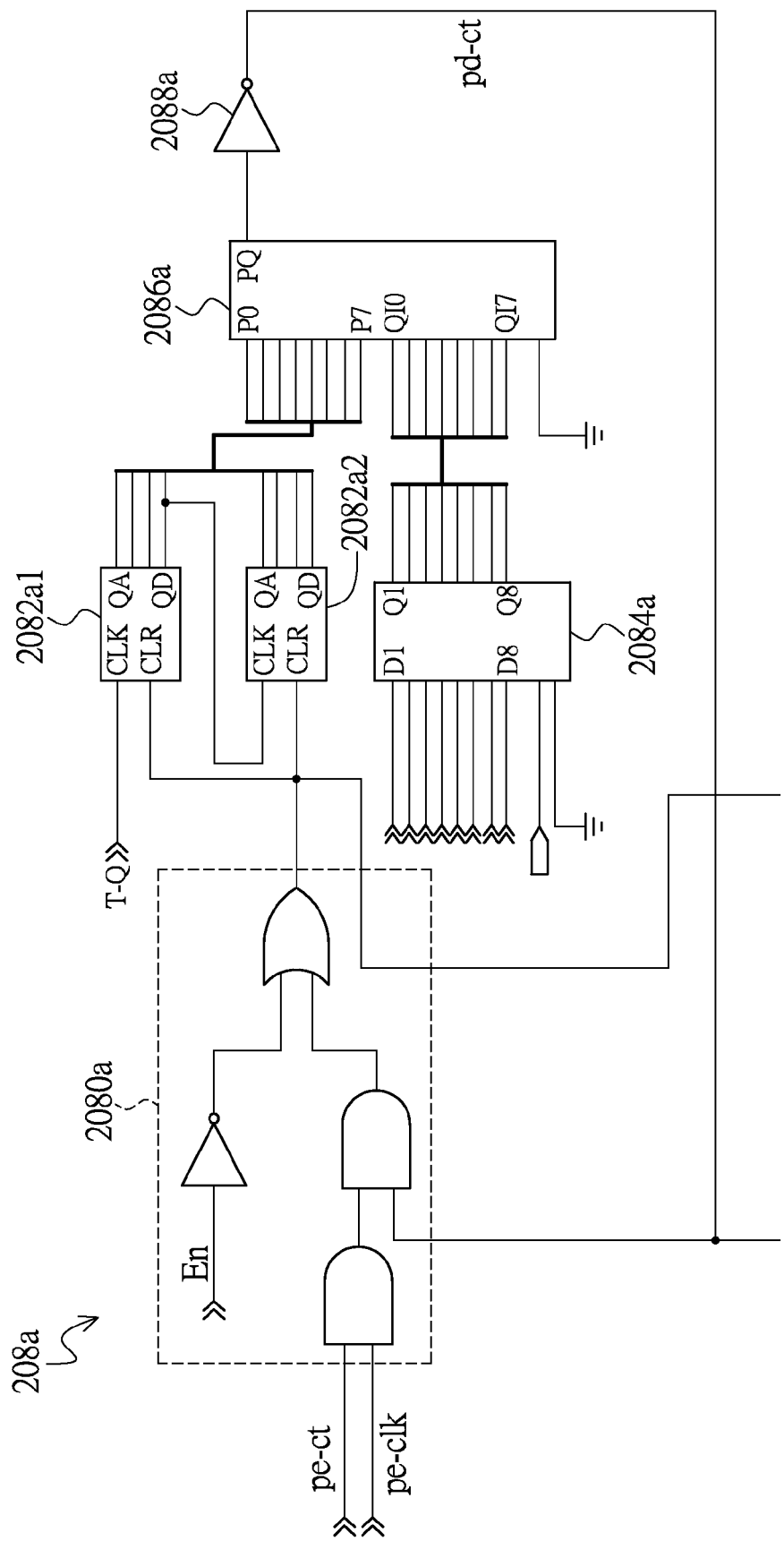
FIG. 4B schematically shows detail circuit of the circular counting unit of FIG. 2B in one embodiment of the present invention.

References are made to FIG. 2A and FIG. 3C. The logic module 14a includes a first inverting unit 141a, a second inverting unit 142a, a logic unit 144a, and a judgment latch unit 146a. The input end of first inverting unit 141a is coupled to the output end PQ of the first comparing unit 104a of the source count module 10a. The output end of the first inverting unit 141a is coupled to the logic unit 144a. The input end of the second inverting unit 142a is coupled to the output end PQ of the first comparing unit 104a of the motion count module 12a. The output end of the second inverting unit 142a is coupled to the logic unit 144a. The output end of the logic unit 144a is coupled to the judgment latch unit 146a. The judgment latch unit 146a is coupled to a switching gate module 16a.

The first or second inverting unit 141a or 142a is an inverter that is used to invert signals. The inverter outputs low logic voltage according to an inputted high logic voltage. On the contrary, the inverter outputs high logic voltage according an inputted low logic voltage. The first or second inverting unit 141a or 142a may not be limited any type in the disclosure. The logic unit 144a has an AND logic gate and an OR logic gate.

The output end of the first inverting unit 141a outputs a source counting signal so-ct for the logic unit 144a. The output end of the second inverting unit 142a outputs a motion counting signal pe-ct to the logic unit 144a. The logic unit 144a outputs a logic clock signal T-CLK to a judgment latch unit 146a according to the source counting signal so-ct and motion counting signal pe-ct. The judgment latch unit 146a then outputs a switching signal T-Q according to the logic clock signal T-CLK.

The judgment latch unit 146a is such as a 74HC73 model Dual JK flip-flop with reset or a negative-edge trigger.

Figure 3D:
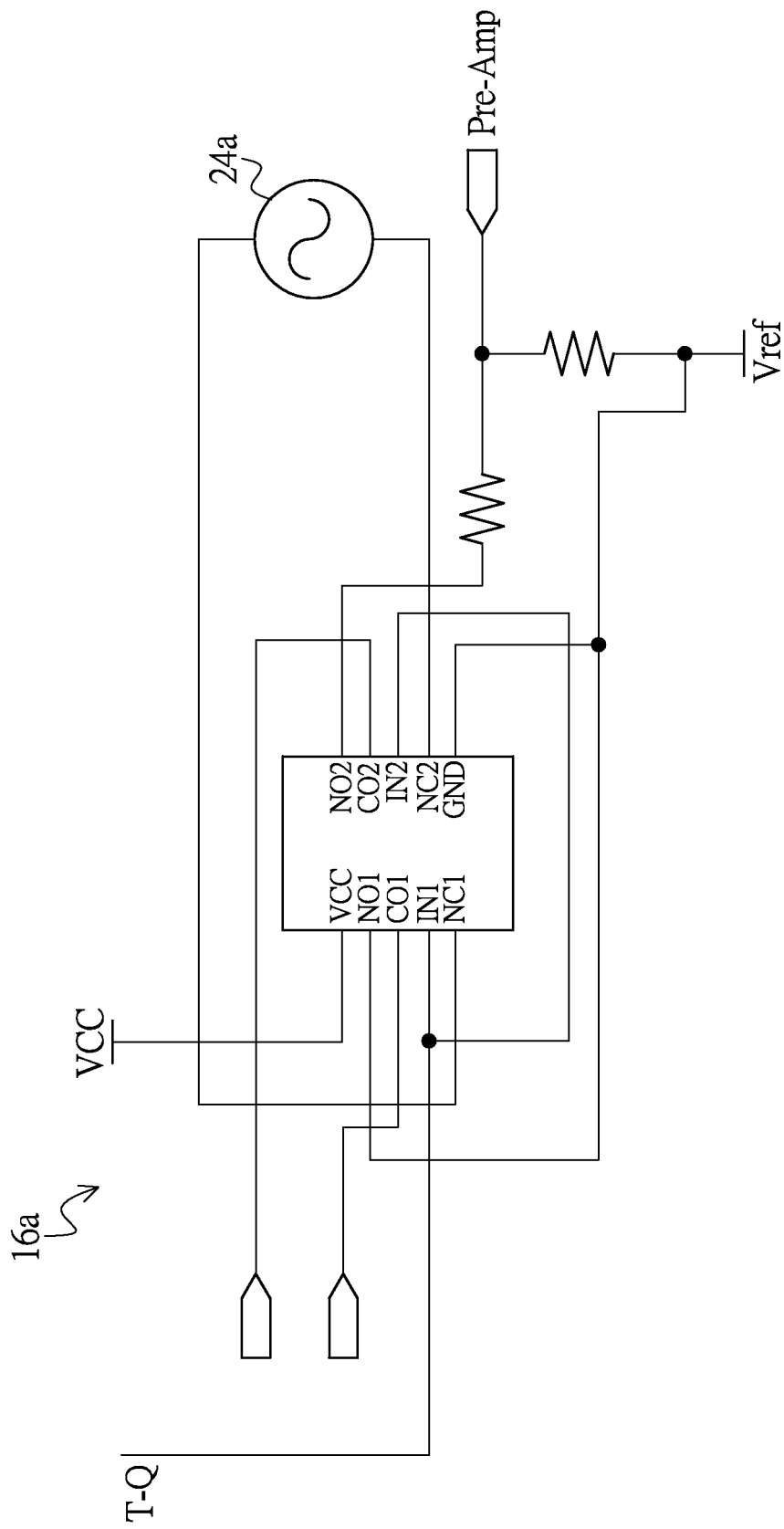
FIG. 3D schematically shows detail circuit of the switching gate module in one embodiment of the present invention.

References are made to FIG. 2A and FIG. 3D. The switching gate module 16a has a control end IN1, a set of first loops NC1 and NC2, a set of second loops NO1 and NO2, and a set of sensing loops CO1 and CO2. The control end IN1 is coupled to the logic module 14a, and used to receive the switching signal T-Q. The first loops NC1 and NC2 are coupled to a power source 24a that couples a sensing coil. The control end IN1 receives the switching signal T-Q with low logic voltage, and the switching gate module 16a is driven to be a transmitter mode. The power source 24a is coupled to the sensing coil, and drives the electromagnetic board to emit first electromagnetic signal to the electromagnetic pen.

Next, the sensing loops CO1 and CO2 are used to be receiver antenna or sensing coil for receiving the second electromagnetic signal made by the electromagnetic pen. The second electromagnetic signal is transmitted to an amplifier, filter, and/or converter via the second loops NO1 and NO2. A second clock signal S2 is therefore generated. In practice, the switching gate module 16a is such as a G3203 SPDT single-pole-double-throw switch. The embodiment may not limit the implementation of the switching gate module 16a.

Figure 3E:
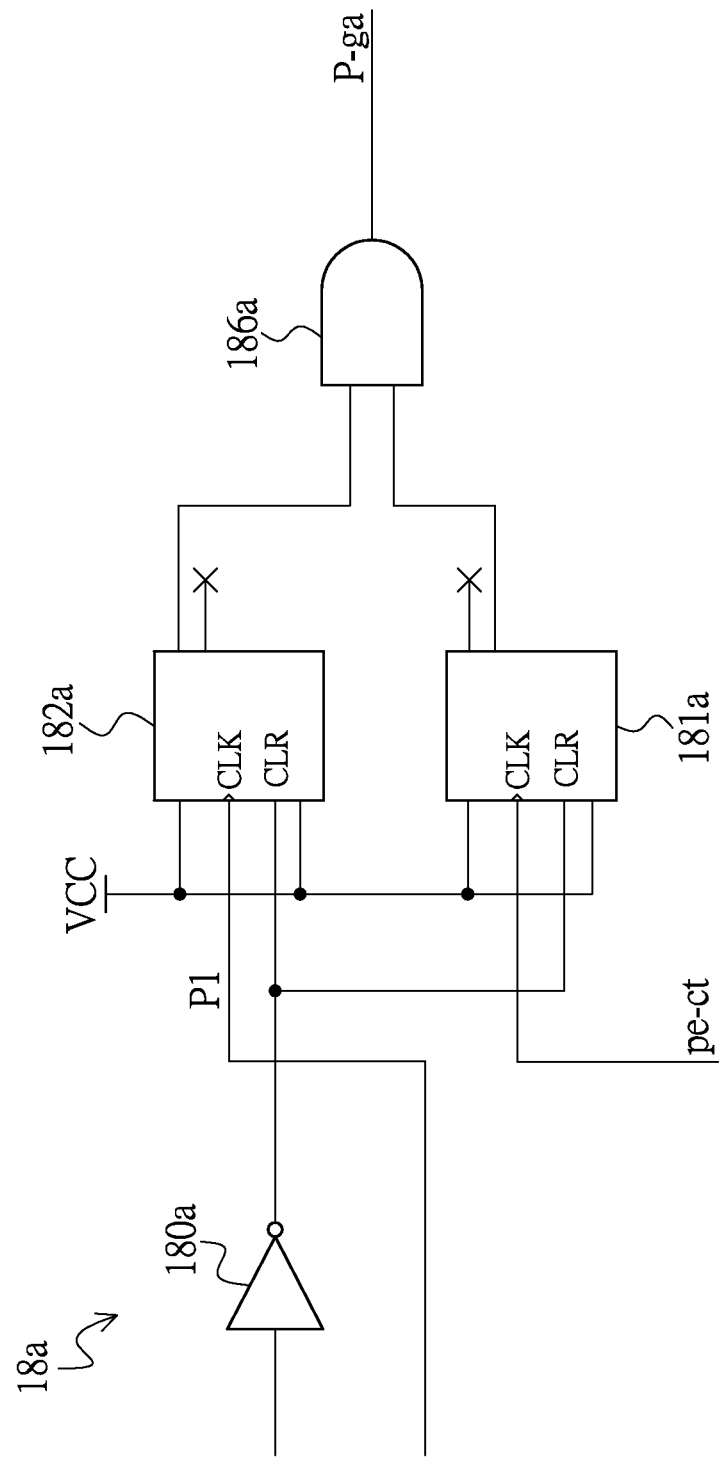
FIG. 3E schematically shows detail circuit of the signal-capturing module in one further embodiment of the present invention.

As FIG. 2A and FIG. 3E show, a signal-capturing module 18a includes a third inverting unit 180a, a first capture-latch unit 181a, a second capture-latch unit 182a, and an AND logic unit 186a. The input end of third inverting unit 180a is coupled to the motion count module 12a, and the output end thereof is coupled to the first capture-latch unit 181a and the second capture-latch unit 182a. The input end of the AND logic unit 186a is coupled to the first capture-latch unit 181a and the second capture-latch unit 182a, and the output end thereof coupled to the frequency-counting module 20a outputs gate enable signal P-ga.

The third inverting unit 180a is an inverter that is used to invert signals. Both the first and second capture-latch unit 181a and 182a are D triggers. The input end CLK of first capture-latch unit 181a is coupled to the output end of the counting units 120a, 120b of the motion count module 12a. The input end CLK of the second capture-latch unit 182a is coupled to the output end of the second inverting unit 142a of the logic module 14a. The AND logic unit 186a is such as an AND logic gate. The type of first, second capture-latch unit 181a, 182a or the AND logic unit 186a may not be limited to the current embodiment.

Next, references are made to FIG. 2B, and FIGS. 4A through 4B. A shown frequency-counting module 20a includes a first logic unit 200a, a second logic unit 202a, multiple counting units 204a, 204b, 204c, and 204d, multiple latch units 206a, 206b, and a circular counting unit 208a. A first input end of the first logic unit 200a is used to receive first high-frequency clock signal HF-clk. A second input end is used to receive gate enable signal P-ga. The output end of the first logic unit 200a is coupled to one of the counting units 204a, 204b, 204c, and 204d. The second logic unit 202a is coupled to the second input end of the circular counting unit 208a and the first logic unit 200a. Those counting units 204a, 204b, 204c, and 204d are coupled to the latch units 206a and 206b, and the circular counting unit 208a. Theses latch units 206a, 206b are coupled to the control module (not shown).

The first logic unit 200a is such as an intersection of the first high-frequency clock signal HF-clk and the gate enable signal P-ga, and used to output the second high-frequency clock signal to the counting units 204a, 204b, 204c, and 204d. The frequency-counting module 20a exemplarily has four counting units 204a, 204b, 204c and 204d. The each of counting units 204a, 204b, 204c and 204d has four output ends QA through QD, so as to output 256 levels image. In some other embodiments, the number of counting units 204a, 204b, 204c and 204d is six, by which outputting the image with 1024, 2048, or 4096 levels of colors. The ordinary person in the art may free to design the number or types of counting units 204a, 204b, 204c and 204d. Further, the counting units 204a, 204b, 204c and 204d, and latch units 206a and 206b of the frequency-counting module 20a are equivalent to the first counting units 100a, 100b, and the first latch unit 102a of the source count module 10a. Also, the frequency-counting module 20a is not limited to the current embodiment.

References are made to FIG. 2B and FIG. 4B. The circular counting unit 208a includes a set of logic components 2080a, two counting components 2082a1 and 2082a2, a latch component 2084a, a comparing component 2086a, and an inverting component 2088a. The logic components 2080a are coupled to the counting components 2082a1 and 2082a2. The input end CLK of the each counting components 2082a1 or 2082a2 is used to receive the switching signal T-Q, and the output ends QA through QD thereof are coupled to the comparing component 2086a. The latch component 2084a is coupled to the comparing component 2086a. The output end PQ of the comparing component 2086a is coupled to the output end of the inverting component 2088a. Further, the output end of the inverting component 2088a is coupled to the second logic unit 202a and the logic components 2080a.

Further references are made to FIG. 2B and FIGS. 4A through 4B. When the circular number of the transceiving rounds of the electromagnetic board and the electromagnetic pen reaches the third predetermined value, the latch component 2084a outputs a latch signal to the comparing component 2086a. The comparing component 2086a outputs a circular cycle signal pd-ct to the second logic unit 202a via the inverting component 2088a, in which the circular cycle signal pd-ct is a signal with high logic voltage. The second logic unit 202a may drive the latches 206a and 206b to latch the logic voltage at the position of the twentieth transceiving round in response to state of intersection of the circular cycle signal pd-ct and the gate enable signal P-ga.

Further, the counting components 2082a1 and 2082a2, a latch component 2084a, and a comparing component 2086a of the circular counting unit 208a may be respectively made by the first counting units 100a and 100b, the first latch unit 102a, and the first comparing unit 104a of the source count module 10a. The current embodiment may not limit the type of the circular counting unit 208a.

Figure 5:
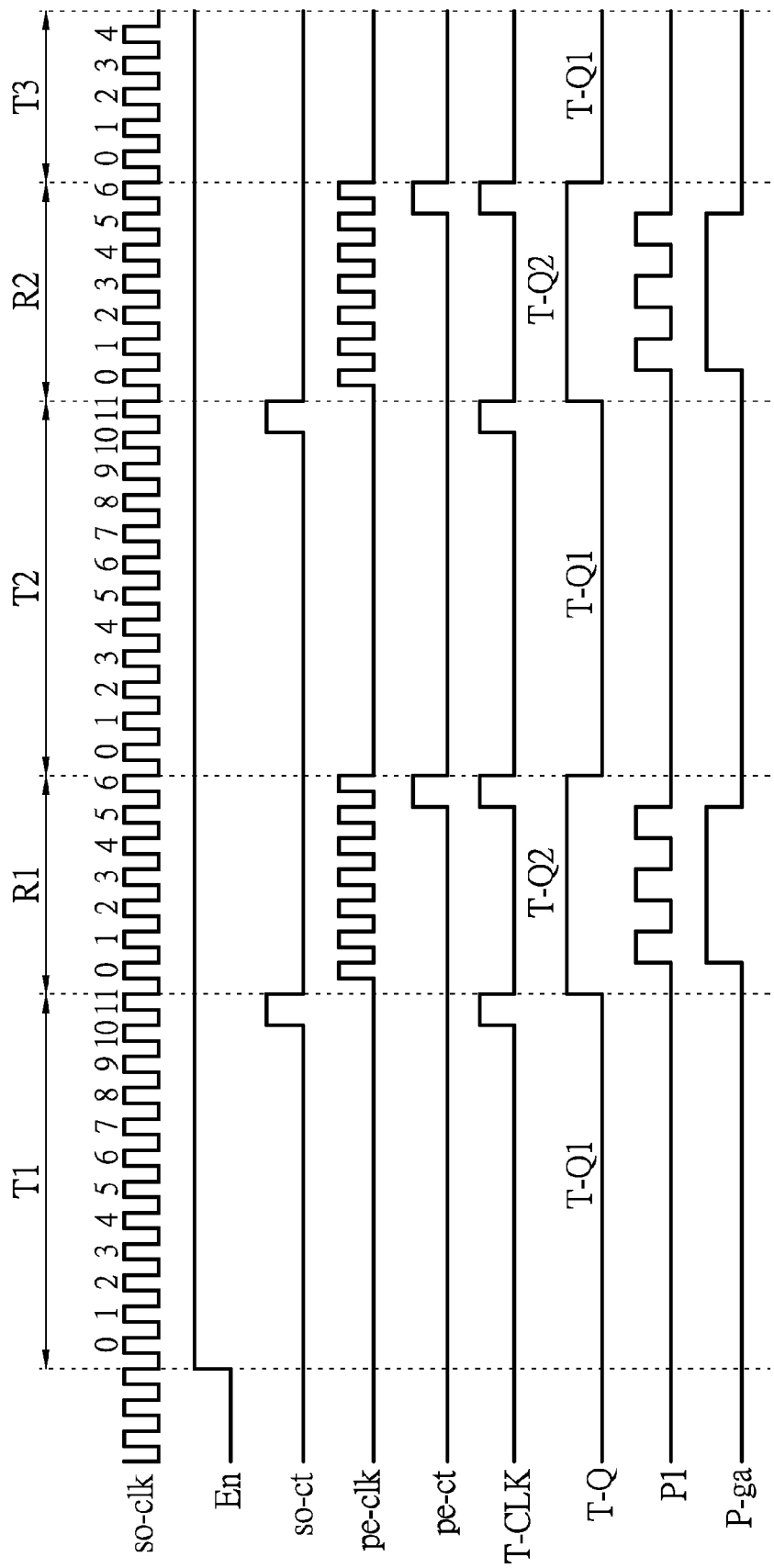
FIG. 5 shows a signal wave diagram for the frequency counter according to one embodiment of the present invention.

Reference is made to FIG. 5 depicting a wave diagram for the frequency counter in one embodiment of the present invention. References are made to FIG. 5, FIG. 2A, and FIG. 2B. In FIG. 5, the label "so-clk" indicates the first clock signal of the source count module 10a; "pe-clk" indicates the second clock signal of the motion count module 12a; "En" is the enable signal for the frequency counter; "so-ct" is the source counting signal; "pe-ct" is such as the motion counting signal; "T-CLK" is logic clock signal; "T-Q" indicates the switching signal outputted by the logic module 14a; "P1" is such as the processing signal of the second clock signal for the motion count module 12a; "P-ga" is the gate enable signal outputted from the signal-capturing module 18a.

Further, the label "T1", "T2", or "T3" indicates the time interval for the electromagnetic board to emit the first electromagnetic signal. The label "R1" or "R2" indicates the time interval the electromagnetic board receives the second electromagnetic signal. In the period of time interval "T1", "T2" or "T3", the clock signal so-clk involves twelve clock pulses. Within the time interval "R1" or "R2", the second clock signal pe-clk has seven clock pulses.

When the electromagnetic board detects the approaching electromagnetic pen, the electromagnetic board is able to have the position of the electromagnetic pen. Then the electromagnetic board generates an enable signal En to enable the frequency counter 1a. Since the frequency counter 1a is enabled, the enable signal En is converted from low logic voltage to high logic voltage. That means the high logic voltage results in the enable signal En within the time intervals "T1" through "T3", and "R1" through "R2", as FIG. 5 shows. The frequency counter 1a then computes the number of clock pulses of the first clock signal so-clk at the source count module 10a. At this moment, the motion count module 12a is at the state in which the number of clock pulses of the second clock signal pe-clk is computed.

For example, within time interval "T1", the source count module 10a computes the number of clock pulses of the first clock signal so-clk, that is to count the twelve clock pulses from zero to eleven. Therefore, the logic voltage at the position of twelfth clock pulse is latched when the count module performs counting of the clock pulses. The latched logic voltage is outputted from the first inverting unit 141a and is as a source counting signal so-ct. It is noted that the source counting signal so-ct is with a square wave, as FIG. 5 shows.

Within the time interval "T1", the motion count module 12a computes number of clock pulses of second clock signal pe-clk, and the number is zero at this moment. The motion count module 12a outputs motion counting signal pe-ct via the second inverting unit 142a. It is noted that the motion counting signal pe-ct is a signal with low logic voltage. The source counting signal so-ct and the motion counting signal pe-ct then output a logic clock signal T-CLK through the logic unit 144a. This logic clock signal T-CLK is such as the signal combination of the source counting signal so-ct and the motion counting signal pe-ct. The logic clock signal T-CLK is with a first clock square wave.

After the judgment latch unit 146a judges the logic clock signal T-CLK, a switching signal T-Q1 is generated. The judgment latch unit 146a may generate a switching signal T-Q1 with low logic voltage when the judgment latch unit 146a finds out odd times of the received clock square waves. On the contrary, the judgment latch unit 146a outputs a switching signal T-Q2 with high logic voltage when the judgment latch unit 146a finds out even times of the received clock square waves. Within the time interval "T1", the second clock signal is such the signal with low logic voltage, that causes the gate enable signal P-ga to be with a low logic voltage, as FIG. 5 shows.

It is noted that the pulse rising edge of the source counting signal so-ct indicates the number of clock pulses of second clock signal pe-clk mad by the motion count module 12a is reset to zero. Further, the pulse falling edge of the source counting signal so-ct indicates the motion count module 12a starts counting the number clock pulses of the second clock signal e-clk. The current embodiment may not limit the scheme to employ the pulse rising edge or falling edge of the source counting signal so-ct.

Further, within the time interval "R1", the motion count module 12a computes the number of seven clock pulses of the second clock signal pe-clk, it is especially computed from zero to sixth clock pulses. When the motion count module 12a computes the seventh clock pulse, the logic voltage at the position of the seventh clock pulse is latched. The latched logic voltage is as the outputted motion counting signal pe-ct through the inverting unit 142a. The motion counting signal pe-ct is with a clock square wave, as FIG. 5 shows.

Within the same time interval "R1", the source count module 10a outputs the source counting signal so-ct through the second inverting unit 142a. The source counting signal so-ct is a signal as in a low logic voltage. The source counting signal so-ct and the motion counting signal pe-ct output a logic clock signal T-CLK via the logic unit 144a. The logic clock signal T-CLK is a signal combination of the source counting signal so-ct and the motion counting signal pe-ct. The logic clock signal T-CLK is with a second clock square wave.

A switching signal T-Q2 is outputted since the logic clock signal T-CLK is judged by the judgment latch unit 146a. In practice, judgment latch unit 146a generates the switching signal T-Q2 with high logic voltage when the judgment latch unit 146a finds output even times of clock square waves.

Within the time interval "R1", it shows the second clock signal is such as a seventh clock pulse. The signal-capturing module 18a may retrieve the five middle clock pulses of the second clock signal pe-clk. The first and seventh clock pulses may be ignored by the signal-capturing module 18a since they are the varying clock pulses. The signal-capturing module 18a adopts the five middle clock pulses to generate the gate enable signal P-ga. It is noted that the "P1" is such as the processing signal of second clock signal of the motion count module 12a. The processing signal, computed by the signal-capturing module 18a, is incorporated to generating the gate enable signal P-ga. Further, the signal-capturing module 18a may also retrieve the nine, seven, or three middle clock pulses from the second clock signal pe-clk. It is noted that the present embodiment may not limit the operation of signal-capturing module 18a.

The rising edge of the motion counting signal pe-ct indicates the number of clock pulses of the first clock signal so-clk computed by the source counting signal so-ct is reset to zero. The falling edge of the motion counting signal pe-ct indicates that the source counting signal so-ct starts counting the number of clock pulses of the first clock signal so-clk. Also, the present embodiment may not limit the operation using the rising edge and falling edge of the motion counting signal pe-ct.

Similarly, within time interval "T2", the operation of frequency counter 1a is such as the operation within the time interval "T1". Within time interval "R2", the operation of frequency counter 1a may work as in the time interval "R1". The operation of frequency counter 1a within the time interval "T3" is such as the operation within the time interval "T1". The frequency counter 1a may operate cyclkally according to the mentioned operations. In an exemplary embodiment, the time intervals "T1" and "R1" is such as the time interval for transceiving rounds of the electromagnetic board and the electromagnetic pen, for example the twenty transceiving rounds of the electromagnetic board and the electromagnetic pen. The number and the operation of transceiving round of the electromagnetic board and the electromagnetic pen may not be limited to the above-mentioned embodiments.

The following example depicts the operation of the nineteenth and twentieth transceiver round for the electromagnetic board and the electromagnetic pen.

Figure 6:
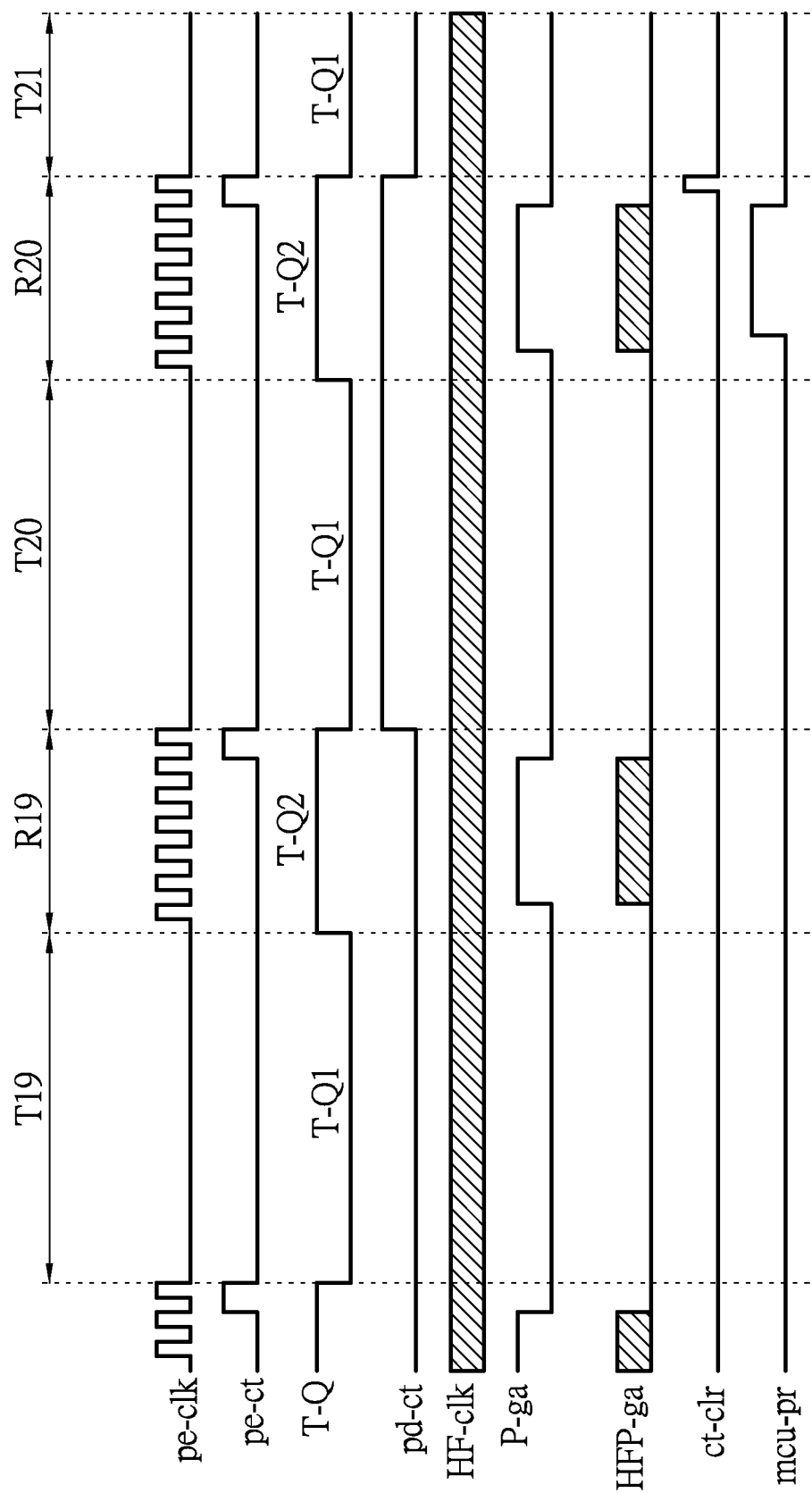
FIG. 6 shows another signal wave diagram for the frequency counter of one embodiment of the present invention.

In FIG. 6, a signal wave diagram of the frequency counter is shown. Further references are also made to FIG. 6, FIG. 2A and FIG. 2B. FIG. 6 shows a first high-frequency clock signal "HF-clk". The label "pd-ct" indicates the circular cycle signal outputted from the circular counting unit 208a. The label "HFP-ga" is a second high-frequency clock signal outputted by the logic unit 200a. "ct-clr" is such as a reset signal.

Within the time interval "T19", the state of intersection of the first high-frequency clock signal HF-clk and the gate enable signal P-ga is such as the second high-frequency clock signal HFP-ga. The second high-frequency clock signal HFP-ga is outputted to the control module (not shown) via the counting units 204a, 204b, 204c, 204d, and the latch units 206a and 206b. By which the electromagnetic board computes a pressure sensing gradation of the pen tip of the electromagnetic pen. The circular cycle signal pd-ct is such as the low logic voltage in first to nineteenth transceiving rounds. As entering the time interval "T20", the latch component 2084a latches the position of twentieth transceiving round. The circular cycle signal pd-ct is converted from the low logic voltage to a high logic voltage.

Within the time interval "R20", the circular counting unit 208a generates a reset signal ct-clr according to the high circular cycle signal pd-ct. This reset signal ct-clr indicates the number of circular number is reset to zero. In other words, from the time "T21", the electromagnetic board and the electromagnetic pen enter one other twenty transceiving rounds. Through computing the second high-frequency clock signal HFP-ga of twenty transceiving rounds, the electromagnetic board is allowed to compute the pressure sensing gradation of the electromagnetic pen's tip. The present embodiment may not limit the type of the any type of waves.

Figures 1, 7:
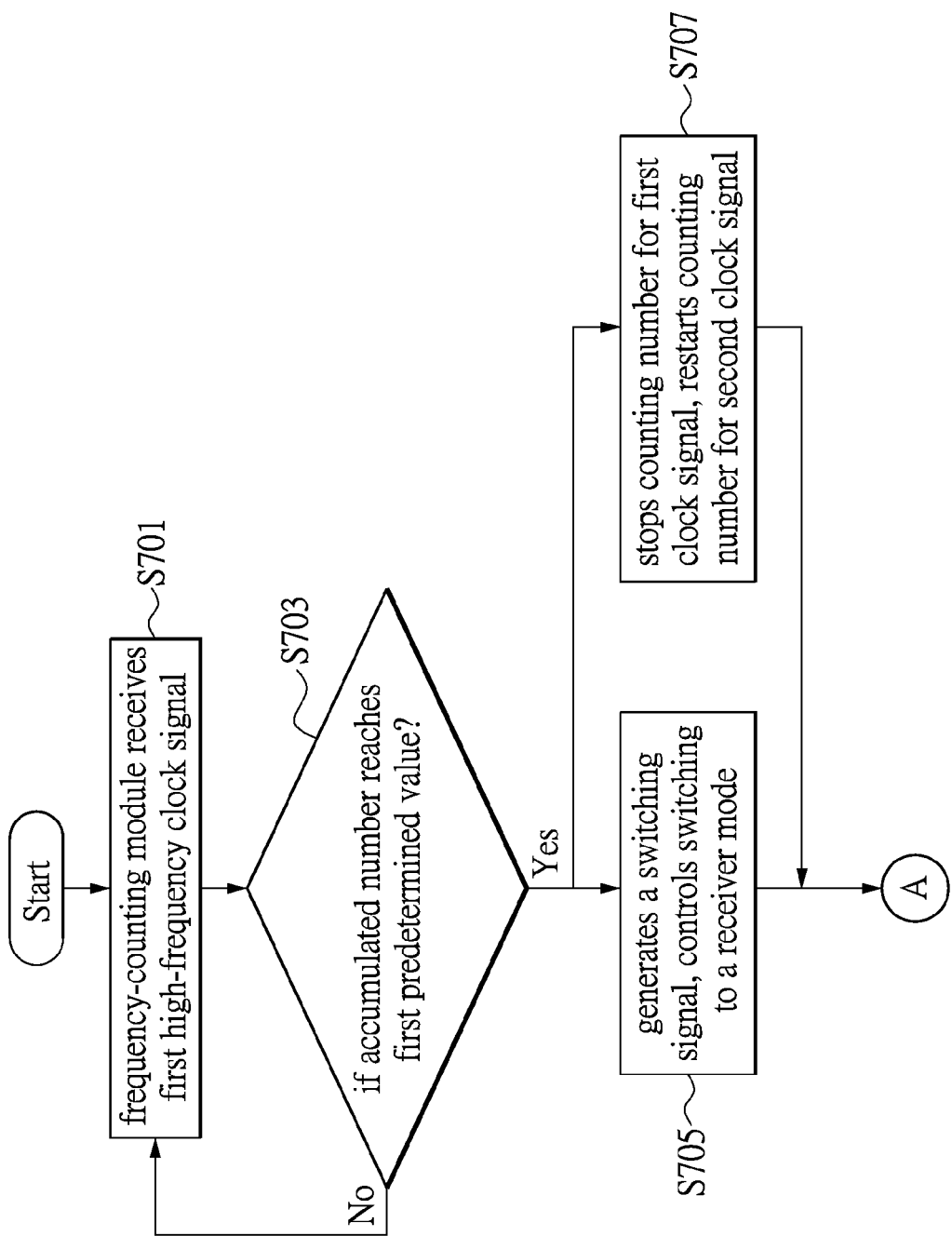
Figures 2, 7:
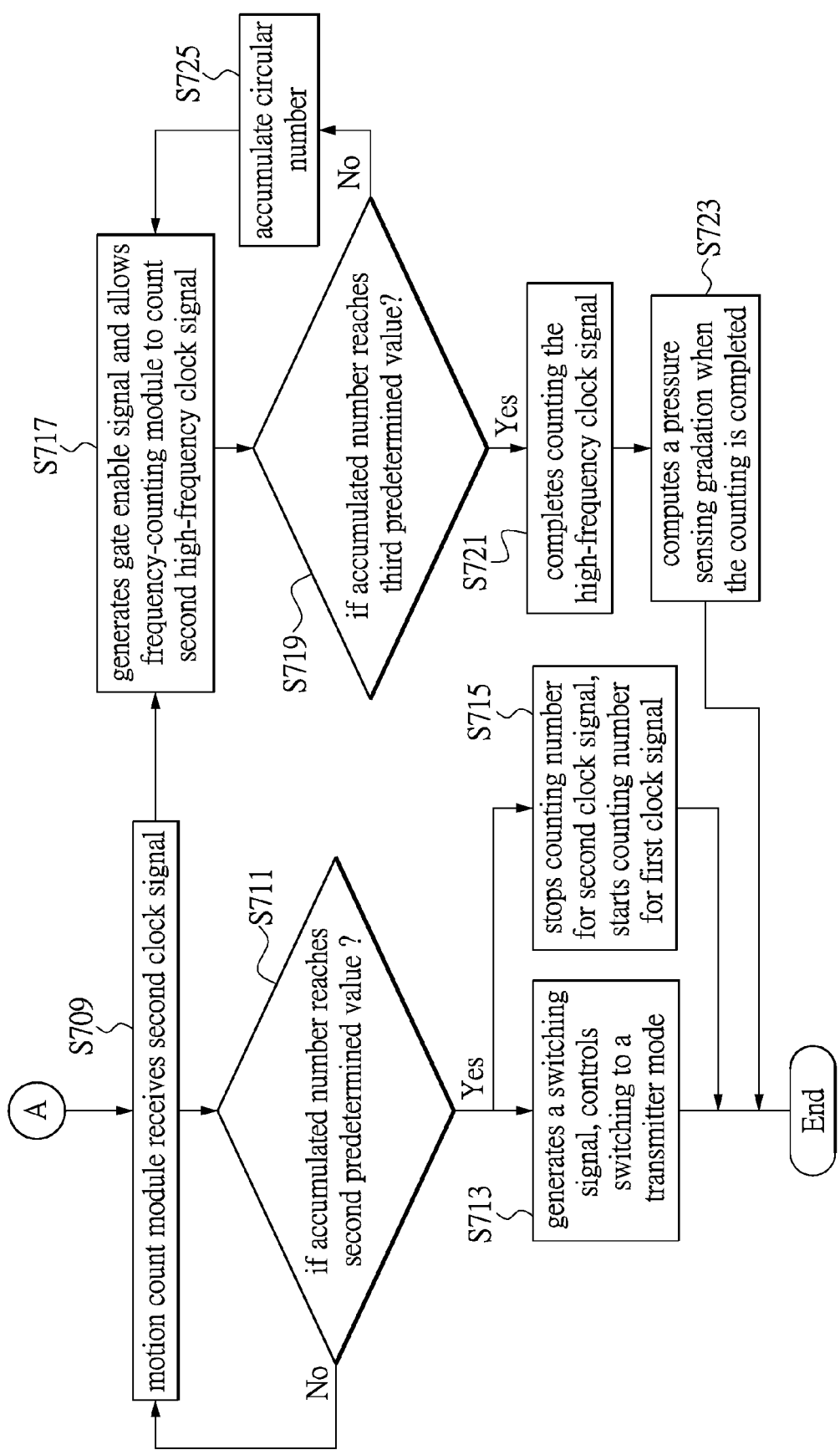

FIG. 7-1 and FIG. 7-2 show two flow charts depicting the method for frequency counting according to one embodiment in accordance with the present invention. As the flow charts show in view of FIG. 1, the method for frequency counting is adapted to the frequency counter 1 of the assembly of an electromagnetic pen and an electromagnetic board.

The signal-capturing module 18 outputs the gate enable signal 根 to the frequency-counting module 20 according to the second clock signal S2. The frequency-counting module 20 receives a first high-frequency clock signal. The frequency-counting module 20 outputs second high-frequency clock signal according to the gate enable signal, or stops outputting the second high-frequency clock signal. The second high-frequency clock signal is such as the output of the first high-frequency clock signal when the frequency-counting module 20 is enabled. The frequency-counting module 20 computes the second high-frequency clock signal of multiple transceiving rounds. The second high-frequency clock signal may indicate the brush stroke or the stroke force. The electromagnetic board may accordingly compute a pressure sensing gradation of the pen tip of the electromagnetic pen. The method for counting the frequency may be referred to the following steps.

In step S701, the source count module 10 receives a first clock signal S1. When the frequency counter 1 is not enabled, the source count module 10 may not compute the number of clock pulses of the first clock signal S1. On the contrary, source count module 10 receives the first clock signal S1 and computes the number of clock pulses of the first clock signal S1 when the frequency counter 1 is enabled.

In step S703, the method is to judge if the accumulated number of clock pulses of the first clock signal S1 reaches a first predetermined value for the source count module 10. The first predetermined value is an integer. If the judgment in step S703 is negative, that means the accumulated number does not reach the first predetermined value, the source count module 10 continues counting the number of clock pulses of the first clock signal S1, and goes to step S701. Otherwise, if the judgment in step S703 is positive, the method goes to step S705. The logic module 14 generates a switching signal for the switching gate module 16, and controls the switching gate module 16 to be switched to a receiver mode.

The mentioned first predetermined value is such as an up limit of the accumulated number of the clock pulses of the first clock signal S1. For example, when the first predetermined value is twelve, the source count module 10 counts the number of clock pulses to eleven namely the accumulated number reaches twelve. The source count module 10 is again enabled to recount the number of the clock pulses.

In step S707, the source count module 10 stops counting the number of clock pulses of the first clock signal S1. The motion count module 12 restarts to count the number of clock pulses of the second clock signal S2. In the period that the source count module 10 restarts counting the number of the clock pulses, and stops counting the number, the electromagnetic board is to electrically charge the electromagnetic pen. When the electromagnetic board stops charging the electromagnetic pen, the electromagnetic pen is in state to discharge for emitting the second electromagnetic signal to the electromagnetic board. In the meantime, the motion count module 12 starts counting the number of clock pulses of the second clock signal S2.

In step S709, the motion count module 12 receives a second clock signal S2. The electromagnetic board receives the second electromagnetic signal made by the electromagnetic pen. The second electromagnetic signal may undergo the amplification circuit, filter, and/or conversion circuit in the electromagnetic board, and the second electromagnetic signal is converted to a second clock signal S2. In which the conversion circuit is originally used to convert the sinusoid wave to the square wave. The motion count module 12 receives the second clock signal S2, and computes the number of clock pulses of the second clock signal S2. In step S711, it is determined if the accumulated number of clock pulses of the second clock signal S2 reaches a second predetermined value of the motion count module 12.

It is noted that the second predetermined value is an integer, and the first predetermined value is larger than the second predetermined value. When the determination is negative in step S711, the motion count module 12 continues counting the number of clock pulses of the second clock signal S2, and the step goes to step S709. On the contrary, the step goes to step S713 if the determination in step S711 is positive. In step S713, the logic module 14 generates a switching signal for the switching gate module 16, and controls the switching gate module 16 to be switched to a transmitter mode. As well in step S715, the motion count module 12 stops counting the number of clock pulses of the second clock signal S2, and the source count module 10 starts counting the number of clock pulses of the first clock signal S1.

The mentioned second predetermined value is such as an up limit of the accumulated number of the clock pulses of the second clock signal S2. For example, if the second predetermined value is set to seven, the motion count module 12 computes the number of clock pulses from zero to six. That means the accumulated number of clock pulses reaches seven. The motion count module 12 is therefore re-enabled to count the number of the clock pulses.

Next, in step S717, the signal-capturing module 18 generates a gate enable signal to the frequency-counting module 20 according to the second clock signal S2. The gate enable signal allows the frequency-counting module 20 to count the second high-frequency clock signal. The signal-capturing module 18 generates the gate enable signal to the frequency-counting module 20, and enables the frequency-counting module 20 to output the second high-frequency clock signal, or stops the frequency-counting module 20 outputting the second high-frequency clock signal. The signal-capturing module 18 outputs the gate enable signal to enable the frequency-counting module 20 in response to the fixed clock pulse in the second clock signal S2.

For example, the number of clock pulses of the second clock signal S2 is counted from one to five. The signal-capturing module 18 outputs the gate enable signal to enable the frequency-counting module 20. In other embodiments, signal-capturing module 18 outputs the gate enable signal to enable the frequency-counting module 20 when the number of clock pulses of the second clock signal S2 is counted from five to six. The ordinary person in the art may free to design the signal-capturing module 18 to output the gate enable signal.

In step S719, it is determined if the accumulated number of circular number of the frequency-counting module 20 reaches a third predetermined value. When the accumulated number reaches the third predetermined value in step S719, the step then goes to step S721, the frequency-counting module 20 completes counting the second high-frequency clock signal. Next, in step S723, the control module 22 computes a pressure sensing gradation of the pen tip of electromagnetic pen according to the second high-frequency clock signal.

The circular number is such as the number of transceiving round having a transmitter mode and a receiver mode. When the frequency-counting module 20 is once enabled by the signal-capturing module 18, the number of circular number of the frequency-counting module 20 is increased. When the circular number reaches the third predetermined value, the frequency-counting module 20 completes counting the second high-frequency clock signal. For example when the third predetermined value is twenty, it means the frequency-counting module 20 needs to count the second high-frequency clock signal for twenty transceiving rounds. When the frequency-counting module 20 completes counting the second high-frequency clock signal, the second high-frequency clock signal is transmitted to the control module 22. The control module 22 computes the pressure sensing gradation of the electromagnetic pen's tip in response to the second high-frequency clock signal.

Furthermore, the frequency-counting module 20 resets the circular number to zero since the counting of the second high-frequency clock signal is completed. In other words, the frequency-counting module 20 resets the number as to enable the gate enable signal. In the meantime, the frequency-counting module 20 receives a first high-frequency clock signal, and the frequency-counting module 20 generates the second high-frequency clock signal for the control module 22 according to the gate enable signal.

When the determination in step S710 is negative, the step goes to step S725, the circular number is accumulated. It is noted that the initial circular number is zero, and increased once when the frequency-counting module is once enabled. Similarly, the circular number may be eleven when the frequency-counting module is enabled for eleventh time. When the initial circular number is twenty, the number may be decreased. Frequency-counting module 20 completes counting the second high-frequency clock signal when the circular number is decreased to zero when the third predetermined value may be zero. The ordinary person in the art may free to design the frequency-counting module 20, the circular number, and the third predetermined value as requires.

It is noted that, in steps S717 through S725, the modules in the electromagnetic board compute the pressure sensing gradation for the electromagnetic pen. The third predetermined value may be larger or smaller in the steps S717 through S725, by which the pressure sensing gradation made by the electromagnetic pen is modifiable. The method in accordance with the present invention may not be limited to the present embodiment.

To sum up, disclosure is related to a frequency counter. The signal-capturing module is provided to output the gate enable signal to the frequency-counting module in response to a second clock signal. The frequency-counting module is enabled to output the second high-frequency clock signal. The circular number of the frequency-counting module is increased when the frequency-counting module is once enabled. The frequency-counting module completes counting the second high-frequency clock signal when the circular number is equal to a third predetermined value. The control module accordingly completes counting the high-frequency clock signal for acquiring the pressure sensing gradation of the electromagnetic pen's tip. The frequency-counting module recounts the number of the second high-frequency clock signal when the accumulated number for enabling the frequency-counting module reaches the third predetermined value. Through the method, the electromagnetic board is able to output high accuracy of pressure sensing gradation of the pen tip of the electromagnetic pen.

It is intended that the specification and depicted embodiment be considered exemplary only, with a true scope of the invention being determined by the broad meaning of the following claims.

What is claimed is:

1. A frequency counter adapted to an electromagnetic board and an electromagnetic pen, and disposed in the electromagnetic board, comprising:

a source count module, used to receive a first clock signal, and the source count module setting a first predetermined value;
   a motion count module, used to receive a second clock signal, and the motion count module setting a second predetermined value, wherein the electromagnetic pen outputs a second electromagnetic signal provided for the electromagnetic board as in discharge mode, and then generates the second clock signal;
   a signal-capturing module, directly coupled with the motion count module;
   a frequency-counting module, directly coupled with the signal-capturing module, setting a circular number;
   a control module, directly coupled with the frequency-counting module; and
   wherein, the signal-capturing module generates a gate enable signal to the frequency-counting module in response to the clock signal, so as to enable the frequency-counting module to count a first high-frequency clock signal; the frequency-counting module outputs number of counting the first high-frequency clock signal to the control module when the cumulative circular number reaches a third predetermined value; the
   control module calculates a frequency of the second electromagnetic signal according to the number of the first high-frequency clock signals;
   the first high-frequency clock signal is a frequency-doubling signal of the second clock signal.

2. The frequency counter according to claim 1, further comprising:
   a logic module, coupled to the source count module and the motion count module; and
   a switching gate module, coupled to the logic module;
   wherein, the source count module calculates a clock pulse of the first clock signal, the logic module generates a switching signal to the switching gate module when an accumulated number of the clock pulses reaches a predetermined value, so as to switch the switching gate module to a receiver mode;
   wherein, when accumulated number, calculated by the motion count module, of clock pulses of the second clock signal reaches the second predetermined value, the logic module generates switching signal to the switching gate module so as to drive the switching gate module to be switched to a transmitter mode;
   wherein, the circular number is a number of transceiving rounds of one time transmitter mode and one time receiver mode; the frequency-counting module receives the first high-frequency clock signal and the frequency-counting module outputs a second high-frequency clock signal according to the gate enable signal; the second high-frequency clock signal is an intersection of the first high-frequency clock signal and the gate enable signal; when the accumulated number of the circular number is determined by the frequency-counting module to reach the third predetermined value, the frequency-counting module resets the accumulated number, and the control module computers a pressure sensing gradation of the electromagnetic pen according to the second electromagnetic signal.

3. The frequency counter according to claim 2, wherein the frequency-counting module includes a first logic unit, a second logic unit, a plurality of counting units, a plurality of latch units, and a circular counting unit; a first input end of the first logic unit is used to receive the first high-frequency clock signal, a second input end of the first logic unit is used to receive the gate enable signal; in response to the gate enable signal, the first logic unit is used to output or stop outputting the second high-frequency clock signal; an output end of the first logic unit is coupled to one of the counting units, the second logic unit is coupled to the circular counting unit and the second input end of the first logic unit; the counting units are coupled to the latch unit and the circular counting unit, and the latch units are coupled to the control module.

4. The frequency counter according to claim 3, wherein the circular counting unit comprises a set of logic components, at least one counting component, a latch component, a comparing component, and an inverting component; wherein the set of logic components are coupled to the at least one counting component, an input end of the at least one counting component is used to receive the switching signal, and an output end of the at least one counting unit is coupled to the comparing component; the latch component is coupled to the comparing component, in which an output end of the comparing component is coupled to an input end of the inverting component, and an output of the inverting component is coupled to the second logic unit and the logic components.

5. The frequency counter according to claim 2, wherein the logic module comprises a first inverting unit, a second inverting unit, a logic unit, and a judgment latch unit; an input end of the first inverting unit is coupled to the source count module, an output end of the first inverting unit is coupled to the logic unit, an input end of the second inverting unit is coupled to the motion count module, an output end of the second inverting unit is coupled to the logic unit, an output end of the logic unit is coupled to the judgment latch unit, and the judgment latch unit is coupled to the switching gate module.

6. The frequency counter according to claim 5, wherein the first inverting unit outputs a source counting signal for the logic unit via the output end, the inverting unit outputs a motion counting signal for the logic unit via the output end, and the logic unit outputs a logic clock signal in response to the source counting signal and the motion counting signal for the judgment latch unit; the judgment latch unit outputs the switching signal according to the logic clock signal, and the switching signal includes a first logic voltage and a second logic voltage, in which the first logic voltage indicates the switching gate module stopping issuing a first electromagnetic signal to the electromagnetic pen, and the second logic voltage indicates the switching gate module starting issuing the first electromagnetic signal to the electromagnetic pen.

7. The frequency counter according to claim 6, wherein the source counting signal's rising edge indicates resetting number of clock pulses of the second clock signal counted by the motion count module; the source counting signal's falling edge indicates the motion count module starts counting number of clock pulses of the second clock signal; the motion counting signal's rising edge indicates resetting number of clock pulses of the first clock signal counted by the source count module; the motion counting signal's falling edge indicates the source count module starts counting number of clock pulses of the first clock signal.

8. The frequency counter according to claim 2, wherein the switching gate module includes a control end, a set of first loops, a set of second loops, and a set of sensing loops; the control end is coupled to the logic module, the set of first loops are coupled to a power source; the set of sensing loops are used to receive a second electromagnetic signal transmitted from the electromagnetic pen, and the second electromagnetic signal is outputted to a signal amplification circuit via the set of second loops.

9. The frequency counter according to claim 1, wherein the signal-capturing module comprises a third inverting unit, a first capture-latch unit, a second capture-latch unit, and a logic unit; an output end of the third inverting unit is coupled to the motion count module, the output end of the third inverting unit is coupled to the first capture-latch unit and the second capture-latch unit; an input end of the logic unit is coupled to the first capture-latch unit and the second capture-latch unit; and an output end, coupled to the frequency counter, of the logic unit outputs the gate enable signal.

10. The frequency counter according to claim 1, wherein, when an accumulated number, counted by the source count module, of clock pulses of the first clock signal reaches the first predetermined value, the source count module stops counting number of clock pulses of the first clock signal, and the motion count module starts recounting number of clock pulses of the second clock signal; when accumulated number, counted by the motion count module, of clock pulses of the second clock signal reaches the second predetermined value, the motion count module stops counting number of clock pulses of the second clock signal, and the source count module starts recounting number of clock pulses of the first clock signal.

11. The frequency counter according claim 1, wherein the source count module comprises at least one first counting unit, a first latch unit, a first comparing unit, and a source unit; an input end of the at least one first counting unit is coupled to the first clock signal, an output end of the at least one first counting unit is coupled to the first comparing unit, the first latch unit is coupled to the first comparing unit, an output end of the first comparing unit is coupled to the logic module, the source unit is coupled to the at least one first counting unit, and the motion count module; the first source unit outputs the clock signal to the at least one counting unit.

12. The frequency counter according to claim 1, wherein the motion count module comprises at least one second counting unit, a second latch unit, a second comparing unit, and an enable unit; an input end of the at least one second counting unit is coupled to the second clock signal, an output end of the at least one second counting unit is coupled to the second comparing unit, the second latch unit is coupled to the second comparing unit, an output end of the second comparing unit is coupled to the logic module, and the enable unit is coupled to the at least one second counting unit, and the source count module.

13. A method of counting frequency, adapted to a frequency counter of assembly of an electromagnetic pen and an electromagnetic board, wherein the frequency counter includes a source count module, a motion count module, a signal-capturing module, a frequency-counting module, and a control module, in which the signal-capturing module is directly coupled to between the motion count module and the frequency-counting module, the control module is directly coupled to the frequency-counting module, a second electromagnetic signal is outputted when the electromagnetic pen is in a discharge mode, so as for the electromagnetic board to receive and process the second electromagnetic signal, and generate a second clock signal, the method comprises:

in response to the second clock signal, the signal-capturing module generating a gate enable signal to the frequency-counting module, so as to enable the frequency-counting module to count a first high-frequency clock signal, which is a frequency-doubling signal of the second clock signal;

judging whether an accumulated number of circular number of the frequency-counting module reaches a third predetermined value;

the frequency-counting module outputting the number of the first high-frequency clock signals to the control module whenever it is judged that the accumulated number reaches the third predetermined value;

in response to the number of the first high-frequency clock signals, the control module computes frequency of the second electromagnetic signal.

14. The method according to claim 13, wherein the frequency counter further comprises a logic module and a switching gate module, wherein the logic module is coupled to the source count module and the motion count module, and the switching gate module is coupled to the logic module, comprising:

the source count module receiving a first clock signal;

judging whether accumulated number of clock pulses of the first clock signal reaches a first predetermined value of the source count module;

the logic module generating a switching signal to the switching gate module whenever it is judged that the accumulated number reaches the first predetermined value, so as to switch the switching gate module to be a receiver mode;

the motion count module receiving the second clock signal;

judging whether accumulated number of clock pulses of the second clock signal reaches a second predetermined value of the motion count module;

the logic module generating the switching signal to the switching gate module whenever it is judged that the accumulated number reaches the second predetermined value, so as to switch the switching gate module to a transmitter mode.

15. The method according to claim 14, wherein, whenever the accumulated number of clock pulses of the first clock signal reaches the first predetermined value, the source count module stops counting the number of clock pulses of the first clock signal, and the motion count module starts recounting number of clock pulses of the second clock signal.

16. The method according to claim 14, wherein, whenever the accumulated number of clock pulses of the second clock signal reaches the second predetermined value, the motion count module stops counting the number of clock pulses of the second clock signal, and the source count module starts recounting the number of clock pulses of the first clock signal.

17. The method according to claim 13, wherein, whenever, the accumulated number of circular number of the frequency-counting module reaches the third predetermined value, the frequency-counting module resets the accumulated number of circular number of the frequency-counting module; wherein the circular number is a number of transceiving rounds including switched to one time the transmitter mode and one time the receiver mode.

\* \* \* \* \*